(12) United States Patent
R et al.

(10) Patent No.: US 11,816,752 B2
(45) Date of Patent: *Nov. 14, 2023

(54) IMAGE-BASED ANALYTICS OF SUPPLY CHAIN OPTIMIZATION PROBLEMS

(71) Applicant: Blue Yonder Group, Inc., Scottsdale, AZ (US)

(72) Inventors: Devanand R, Bandalore (IN); Narayan Nandeda, Ujjain (IN); Tushar Shekhar, Bengaluru (IN)

(73) Assignee: Blue Yonder Group, Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/120,663

(22) Filed: Mar. 13, 2023

(65) Prior Publication Data

US 2023/0281747 A1  Sep. 7, 2023

Related U.S. Application Data

(63) Continuation of application No. 17/947,804, filed on Sep. 19, 2022, now Pat. No. 11,615,498, which is a continuation of application No. 16/886,681, filed on May 28, 2020, now Pat. No. 11,461,866.

(60) Provisional application No. 62/893,470, filed on Aug. 29, 2019, provisional application No. 62/856,353, filed on Jun. 3, 2019.

(51) Int. Cl.
*G06Q 50/28* (2012.01)
*G06Q 10/067* (2023.01)
*G06T 11/00* (2006.01)
*G06T 11/20* (2006.01)
*G06Q 10/0631* (2023.01)

(52) U.S. Cl.
CPC .......... *G06Q 50/28* (2013.01); *G06Q 10/067* (2013.01); *G06Q 10/06315* (2013.01); *G06T 11/001* (2013.01); *G06T 11/206* (2013.01)

(58) Field of Classification Search
CPC .................................................. G06Q 50/28
See application file for complete search history.

(56) References Cited

U.S. PATENT DOCUMENTS 7,672,862 B1 * 3/2010 Venkatasubramanyan ..................
G06Q 10/08
705/7.22
2002/0156663 A1 * 10/2002 Weber .............. G06Q 10/06375
705/7.11

* cited by examiner

*Primary Examiner* — Shivang I Patel
(74) *Attorney, Agent, or Firm* — Spencer Fane LLP; Steven J. Laureanti

(57) ABSTRACT

A system and method are disclosed for image analysis of supply chain planning problems modeled as a linear programming (LP) problems. Embodiments include receiving an LP matrix representing constraints and variables of at least a portion of a supply chain planning problem, generating a sorted variable index for the variables of the LP matrix, generating a sorted constraint index for the constraints of the LP matrix, identifying functions of the variables and the constraints, selecting one or more colors of pixels of a supply chain problem image based, at least in part, on the identified functions of the variables and constraints, selecting locations of the pixels, and displaying a visualization of the supply chain problem image.

20 Claims, 22 Drawing Sheets

IMAGE-BASED ANALYTICS OF SUPPLY CHAIN OPTIMIZATION PROBLEMS

CROSS-REFERENCE TO RELATED APPLICATIONS

The present disclosure is a continuation of U.S. patent application Ser. No. 17/947,804, filed on Sep. 19, 2022, entitled "Image-Based Analytics of Supply Chain Optimization Problems," which is a continuation of U.S. patent application Ser. No. 16/886,681, filed on May 28, 2020, entitled "Image-Based Analytics of Supply Chain Optimization Problems," now U.S. Pat. No. 11,461,866, which claims the benefit under 35 U.S.C. § 119(e) to U.S. Provisional Application No. 62/893,470, filed Aug. 29, 2019, entitled "Image-Based Analytics of Supply Chain Optimization Problems" and U.S. Provisional Application No. 62/856,353, filed Jun. 3, 2019, entitled "Image Based Analytics of Supply Chain Optimization Problem." U.S. patent application Ser. No. 17/947,804, U.S. Pat. No. 11,461,866, and U.S. Provisional Application Nos. 62/893,470 and 62/856,353 are assigned to the assignee of the present application.

TECHNICAL FIELD

The present disclosure relates generally to supply chain planning and specifically to systems and methods of image analysis of supply chain planning problems.

BACKGROUND

During supply chain planning, a supply chain plan may be generated by modeling and solving a supply chain planning problem as a linear programming (LP) problem. Although this approach may generate optimal solutions, solving LP problems may be resource intensive, and often requires simplifying constraints or objectives to finish the solve within pre-specified batch solve windows. Speeding up solve times can sometimes be accomplished by decomposing a monolithic LP into multiple smaller problems, which are then solved individually. Unfortunately, monolithic LP problems are generally not amenable to standard decomposition techniques. Further, measures of problem complexity represented in LP problems are non-intuitive for most users, which do not provide much information and interactivity for further analysis. The inability to analyze LP problems to improve solving speed of supply chain planning problems is undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Figure 1:
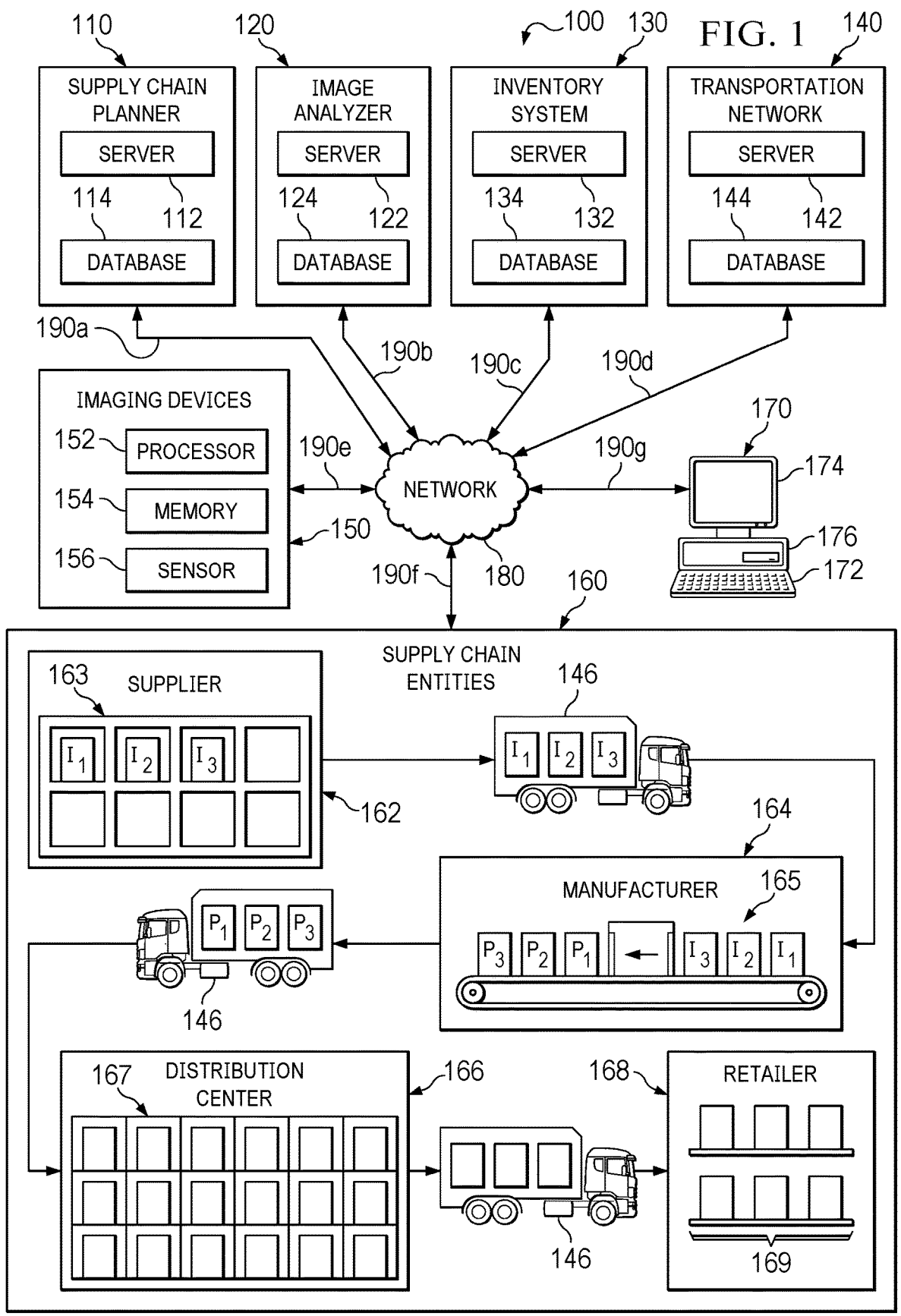
FIG. 1 illustrates a supply chain network, according to a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

FIG. 1 illustrates supply chain network 100, according to a first embodiment. Supply chain network 100 comprises supply chain planner 110, image analyzer 120, inventory system 130, transportation network 140, one or more imaging devices 150, one or more supply chain entities 160, one or more computers 170, network 180, and one or more communication 190a-190g links. Although a single supply chain planner 110, a single image analyzer 120, a single inventory system 130, a single transportation network 140, one or more imaging devices 150, one or more supply chain entities 160, one or more computers 170, a single network 180, and one or more communication links 190a-190g are shown and described, embodiments contemplate any number of supply chain planners, image analyzers, inventory systems, transportation networks, imaging devices, supply chain entities, computers, networks, and communication links, according to particular needs.

In one embodiment, supply chain planner 110 comprises server 112 and database 114. Server 112 comprises one or more modules to model, generate, and solve a supply chain planning problem. Using the solution of the supply chain planning problem, supply chain planner 110 generates supply chain plans, which may include, but are not limited to master supply chain plans, production plans, operations plans, distribution plans, and the like. In one embodiment, supply chain planner 110 generates an operation plan, which may comprise, for example, the timing of supply chain operations and the volume of items and resources to consume that are calculated to meet one or more business goals while conforming to supply chain constraints.

As described in more detail below, supply chain planner 110 solves the supply chain planning problem by optimizing business objectives in the presence of constraints, in a multitude of different supply chain domains. Generating a supply chain planning problem comprises domain-specific pre-processing and formulation that precedes the generation of a matrix representing, at least in part, the supply chain planning problem. Domain-specific measures of the problem complexity vary greatly depending on the nature of the problem to be solved. By way of example only and not by way of limitation, overly low or high yields indicate the complexity for a supply chain master problem, whereas the amount of source-destination combinations indicates complexity for a last-mile delivery optimization problem.

Image analyzer 120 comprises server 122 and database 124. Server 122 comprises one or more modules that generate one or more visualizations that provide insight into the complexity of supply chain planning problems and changes that may lead to simpler formulation, irrespective of the domain from which the linear programming (LP) problem has been formulated. Although embodiments described in more detail below identify insights into LP supply chain planning problems, embodiments contemplate image analyzer 120 providing visualization of LP problems from other domains, such as, for example, a visualization of an item-location matrix formulated by a warehouse management system, according to particular needs.

Inventory system 130 comprises server 132 and database 134. Server 132 of inventory system 130 is configured to receive and transmit item identifiers, pricing, attributes, inventory levels, and other like inventory system data about one or more items at one or more locations in supply chain network 100. Server 132 stores and retrieves inventory system data from database 134 or one or more locations in supply chain network 100.

Transportation network 140 comprises server 142 and database 144. According to embodiments, transportation network 140 directs one or more transportation vehicles 146 to ship one or more items between one or more supply chain entities 160 based, at least in part, on a supply chain plan or a re-allocation of materials or capacity determined by supply chain planner 110. One or more transportation vehicles 146 comprise, for example, any number of trucks, cars, vans, boats, airplanes, unmanned aerial vehicles (UAVs), cranes, robotic machinery, or the like. The quantity of items shipped by one or more transportation vehicles 146 may be based, at least in part, on the number of items currently in stock at one or more stocking locations of one or more supply chain entities 160, the number of items currently in transit, a forecasted demand, a supply chain disruption, and the like. According to embodiments, one or more transportation 146 vehicles may be associated with one or more supply chain entities 160 and may be directed by automated navigation including, for example, GPS guidance, according to particular needs.

One or more imaging devices 150 comprise one or more electronic devices having one or more processors 152, memory 154, one or more sensors 156, and may include any suitable input device, output device, fixed or removable computer-readable storage media, or the like. According to embodiments, one or more imaging devices 150 identify one or more items near one or more sensors 156 and generate a mapping of the identified one or more items in supply chain network 100. As explained in more detail below, transportation network 140, one or more suppliers 162, one or more manufacturers 164, one or more distribution centers 166, and one or more retailers 168 use the mapping of an item to locate the item in supply chain network 100. The location of the item may then be used to coordinate the storage and transportation of the same item or other items in supply chain network 100 and according to one or more supply chain plans and/or a reallocation of materials or capacity.

According to embodiments, one or more imaging devices 150 comprise a mobile handheld device such as, for example, a smartphone, a tablet computer, a wireless device, a networked electronic device, or the like. One or more imaging devices 150 may be configured to transmit item identifiers to one or more databases local to, or remote from, supply chain network 100 in response to scanning one or items by one or more sensors 156. This may include, for example, a stationary scanner located at transportation network 140 (including one or more transportation vehicles 146), one or more suppliers 162, one or more manufacturers 164, one or more distribution centers 166, or one or more retailers 168 that identifies items as the items pass near the scanner. One or more sensors 156 of one or more imaging devices 150 may comprise an imaging sensor, such as, a camera, scanner, electronic eye, photodiode, charged coupled device (CCD), barcode scanner, or any sensor that detects electromagnetic radiation from, for example, products, product images, labels, barcodes, or the like. In addition, or as an alternative, one or more sensors 156 may comprise a radio receiver and/or transmitter configured to read an electronic tag coupled with a product, such as, for example, an RFID tag.

As shown in FIG. 1, supply chain network 100 comprising supply chain planner 110, image analyzer 120, inventory system 130, transportation network 140, one or more imaging devices 150, and one or more supply chain entities 160 may operate on one or more computers 170 that are integral to, or separate from, the hardware and/or software that support supply chain planner 110, image analyzer 120, inventory system 130, transportation network 140, one or more imaging devices 150, and one or more supply chain entities 160. One or more computers 170 may include any suitable input device 172, such as a keypad, mouse, touch screen, microphone, or other device to input information. Output device 174 may convey information associated with the operation of supply chain network 100, including digital or analog data, visual information, or audio information.

One or more computers 170 may include fixed or removable computer-readable storage media, including a non-transitory computer-readable medium, magnetic computer disk, flash drive, CD-ROM, in-memory device or other suitable medium to receive output from, and provide input to, supply chain network 100. One or more computers 170 may include one or more processors 176 and associated memory to execute instructions and manipulate information according to the operation of supply chain network 100 and any of the methods described herein. In addition, or as an alternative, embodiments contemplate executing the instructions on one or more computers 170 that cause one or more computers 170 to perform functions of the method. An apparatus implementing special purpose logic circuitry, for example, one or more field programmable gate arrays (FPGA) or application-specific integrated circuits (ASIC), may perform functions of the methods described herein. Further examples may also include articles of manufacture including tangible computer-readable media that have computer-readable instructions encoded thereon, and the instructions may comprise instructions to perform functions of the methods described herein.

Supply chain planner 110, image analyzer 120, inventory system 130, transportation network 140, one or more imaging devices 150, and one or more supply chain entities 160 may each operate on one or more separate computers 170, a network of one or more separate or collective computers, or may operate on one or more shared computers. In addition, supply chain network 100 may comprise a cloud-based computing system having processing and storage devices at one or more locations, local to, or remote from supply chain planner 110, image analyzer 120, inventory system 130, transportation network 140, one or more imaging devices 150, and one or more supply chain entities 160. In addition, each of one or more computers 170 may be a work station, personal computer (PC), network computer, notebook computer, tablet, personal digital assistant (PDA), cell phone, telephone, smartphone, mobile device, wireless data port, augmented or virtual reality headset, or any other suitable computing device. One or more users may be associated with supply chain planner 110, image analyzer 120, inventory system 130, transportation network 140, one or more imaging devices 150, and one or more supply chain entities 160. These one or more users may include, for example, a "manager" or a "planner" handling supply chain planning and/or one or more related tasks within supply chain network 100. In addition, or in the alternative, these one or more users within supply chain network 100 may include, for example, one or more computers 170 programmed to autonomously handle, among other things, production planning, demand planning, option planning, sales and operations planning, supply chain maser planning, plan adjustment after disruptive events, order placement, automated warehouse operations (including removing items from and placing items in inventory), robotic production machinery, and/or one or more related tasks within supply chain network 100.

One or more supply chain entities 160 may represent one or more suppliers 162, one or more manufacturers 164, one or more distribution centers 166, and one or more retailers 168 in one or more supply chain networks, including one or more enterprises. One or more suppliers 162 may be any suitable entity that offers to sell or otherwise provides one or more components to one or more manufacturers 164. One or more suppliers 162 may, for example, receive a product from a first one or more supply chain entities 160 in supply chain network 100 and provide the product to another one or more supply chain entities 160. One or more suppliers 162 may comprise automated distribution systems 163 that automatically transport products to one or more manufacturers 164 based, at least in part, on a supply chain plan, a material or capacity reallocation, current and projected inventory levels, and/or one or more additional factors described herein. Items may comprise, for example, components, materials, products, parts, supplies, or other items, that may be used to produce products. In addition, or as an alternative, an item may comprise a supply or resource that is used to manufacture the item, but does not become a part of the item.

One or more manufacturers 164 may be any suitable entity that manufactures at least one product. One or more manufacturers 164 may use one or more items during the manufacturing process to produce any manufactured, fabricated, assembled, or otherwise processed item, material, component, good or product. In one embodiment, a product represents an item ready to be supplied to, for example, another one or more supply chain entities 160, such as one or more suppliers 162, an item that needs further processing, or any other item. One or more manufacturers 164 may, for example, produce and sell a product to one or more suppliers 162, another one or more manufacturers 164, one or more distribution centers 166, one or more retailers 168, one or more customers, or any one or more other suitable persons or entities. Such one or more manufacturers 164 may comprise automated robotic production machinery 165 that produce products based, at least in part, on a supply chain plan, a material or capacity reallocation, current and projected inventory levels, and/or one or more additional factors described herein.

One or more distribution centers 166 may be any suitable entity that offers to sell or otherwise distributes at least one product to one or more retailers 168 and/or customers. One or more distribution centers 166 may, for example, receive a product from a first one or more supply chain entities 160 in supply chain network 100 and store and transport the product for a second one or more supply chain entities 160. Such one or more distribution centers 166 may comprise automated warehousing systems 167 that automatically transport to one or more retailers 168 or customers and/or automatically remove an item from, or place an item into, inventory based, at least in part, on a supply chain plan, a material or capacity reallocation, current and projected inventory levels, and/or one or more additional factors described herein.

One or more retailers 168 may be any suitable entity that obtains one or more products to sell to one or more customers. In addition, one or more retailers 168 may sell, store, and supply one or more components and/or repair a product with one or more components. One or more retailers 168 may comprise any online or brick and mortar location, including locations with product placement locations such as, for example, shelving systems 169. Shelving systems 169 may comprise various racks, fixtures, brackets, notches, grooves, slots, or other attachment devices for fixing shelves or product placement locations in various configurations. These configurations may comprise adjustable lengths, heights, and arrangements, which may be adjusted by an employee of one or more retailers 168 based on computer-generated instructions or automatically by machinery to place products in a calculated product placement location.

Although one or more suppliers 162, one or more manufacturers 164, one or more distribution centers 166, and one or more retailers 168 are shown and described as separate and distinct, one or more suppliers 162, one or more manufacturers 164, one or more distribution centers 166, and one or more retailers 168 may simultaneously be any other one or more suppliers 162, one or more manufacturers 164, one or more distribution centers 166, and one or more retailers 168. For example, one or more supply chain entities 160 may produce one or more products as one or more manufacturers 164, and the same one or more supply chain entities 160 may supply a product as one or more suppliers 162 to another one or more supply chain entities 160. Although one example of supply chain network 100 is shown and described, embodiments contemplate any suitable configuration of supply chain network 100, without departing from the scope of the present disclosure.

In one embodiment, supply chain planner 110 may be coupled with network 180 using communication link 190*a*, which may be any wireline, wireless, or other link suitable to support data communications between supply chain planner 110 and network 180 during operation of supply chain network 100. In one embodiment, image analyzer 120 may be coupled with network 180 using communication link 190*b*, which may be any wireline, wireless, or other link suitable to support data communications between image analyzer 120 and network 180 during operation of supply chain network 100. Inventory system 130 may be coupled with network 180 using communication link 190*c*, which may be any wireline, wireless, or other link suitable to support data communications between inventory system 130 and network 180 during operation of supply chain network 100. Transportation network 140 may be coupled with network 180 using communication link 190*d*, which may be any wireline, wireless, or other link suitable to support data communications between transportation network 140 and network 180 during operation of supply chain network 100. One or more imaging devices 150 are coupled with network 180 using communication link 190*e*, which may be any wireline, wireless, or other link suitable to support data communications between one or more imaging devices 150 and network 180 during operation of distributed supply chain network 100. One or more supply chain entities 160 may be coupled with network 180 using communication link 190*f*, which may be any wireline, wireless, or other link suitable to support data communications between one or more supply chain entities 160 and network 180 during operation of supply chain network 100. One or more computers 170 may be coupled with network 180 using communication link 190*g*, which may be any wireline, wireless, or other link suitable to support data communications between one or more computers 170 and network 180 during operation of supply chain network 100.

Although communication links 190*a*-190*g* are shown as generally coupling supply chain planner 110, image analyzer 120, inventory system 130, transportation network 140, one or more imaging devices 150, one or more supply chain entities 160, and one or more computers 170 to network 180, each of supply chain planner 110, image analyzer 120, inventory system 130, transportation network 140, one or more imaging devices 150, one or more supply chain entities 160, and one or more computers 170 may communicate directly with each other, according to particular needs.

In another embodiment, network 180 includes the Internet and any appropriate local area networks (LANs), metropolitan area networks (MANs), or wide area networks (WANs) coupling supply chain planner 110, image analyzer 120, inventory system 130, transportation network 140, one or more imaging devices 150, one or more supply chain entities 160, and one or more computers 170. For example, data may be maintained by locally or externally of supply chain planner 110, image analyzer 120, inventory system 130, transportation network 140, one or more imaging devices 150, one or more supply chain entities 160, and one or more computers 170 and made available to one or more associated users of supply chain planner 110, image analyzer 120, inventory system 130, transportation network 140, one or more imaging devices 150, one or more supply chain entities 160, and one or more computers 170 using network 180 or in any other appropriate manner. For example, data may be maintained in a cloud database at one or more locations external to supply chain planner 110, image analyzer 120, inventory system 130, transportation network 140, one or more imaging devices 150, one or more supply chain entities 160, and one or more computers 170 and made available to one or more associated users of supply chain planner 110, image analyzer 120, inventory system 130, transportation network 140, one or more imaging devices 150, one or more supply chain entities 160, and one or more computers 170 using the cloud or in any other appropriate manner. Those skilled in the art will recognize that the complete structure and operation of network 180 and other components within supply chain network 100 are not depicted or described. Embodiments may be employed in conjunction with known communications networks and other components.

In accordance with the principles of embodiments described herein, supply chain planner 110 may reallocate inventory of one or more items among demands or orders of one or more supply chain entities 160. Furthermore, one or more computers 170 associated with supply chain network 100 may instruct automated machinery (e.g. robotic warehouse systems, robotic inventory systems, automated guided vehicles, mobile racking units, automated robotic production machinery, robotic devices, and the like) to adjust product mix ratios, inventory levels at various stocking points, production of products by manufacturing equipment, proportional or alternative sourcing of one or more supply chain entities 160, and the configuration and quantity of packaging and shipping of items based on current inventory, production levels, and/or one or more other factors described herein. For example, the methods described herein may include one or more computers 170 receiving product data 234 from automated machinery having one or more sensors 156 and product data 234 corresponding to an item detected by the automated machinery. The received product data 234 may include an image of the item, an identifier, as described above, and/or other data associated with the item, including, for example, dimensions, texture, estimated weight, and the like.

The methods may further include one or more computers 170 looking up received product data 234 in database 112 associated with supply chain planner 110 to identify the item corresponding to product data 234 received from automated machinery. Based on the identification of the item, one or more computers 170 may also identify (or alternatively generate) a first mapping in database 114, where the first mapping is associated with the current location of the identified item. One or more computers 170 may also identify a second mapping in database 114, where the second mapping is associated with a past location of the identified item. One or more computers 170 may compare the first mapping and the second mapping to determine if the current location of the identified item in the first mapping is different than the past location of the identified item in the second mapping. Based, as least in part, on one or more differences between the first mapping and the second mapping, one or more computers 170 may send instructions to the automated machinery to, for example, locate items to add to or remove from an inventory of, or shipment for, one or more supply chain entities 160. In addition, or in the alternative, supply chain planner 110 monitors one or more supply chain constraints of one or more items at one or more supply chain entities 160 and adjusts the orders and/or inventory of one or more supply chain entities 160 at least partially based on one or more supply chain constraints.

Figure 2:
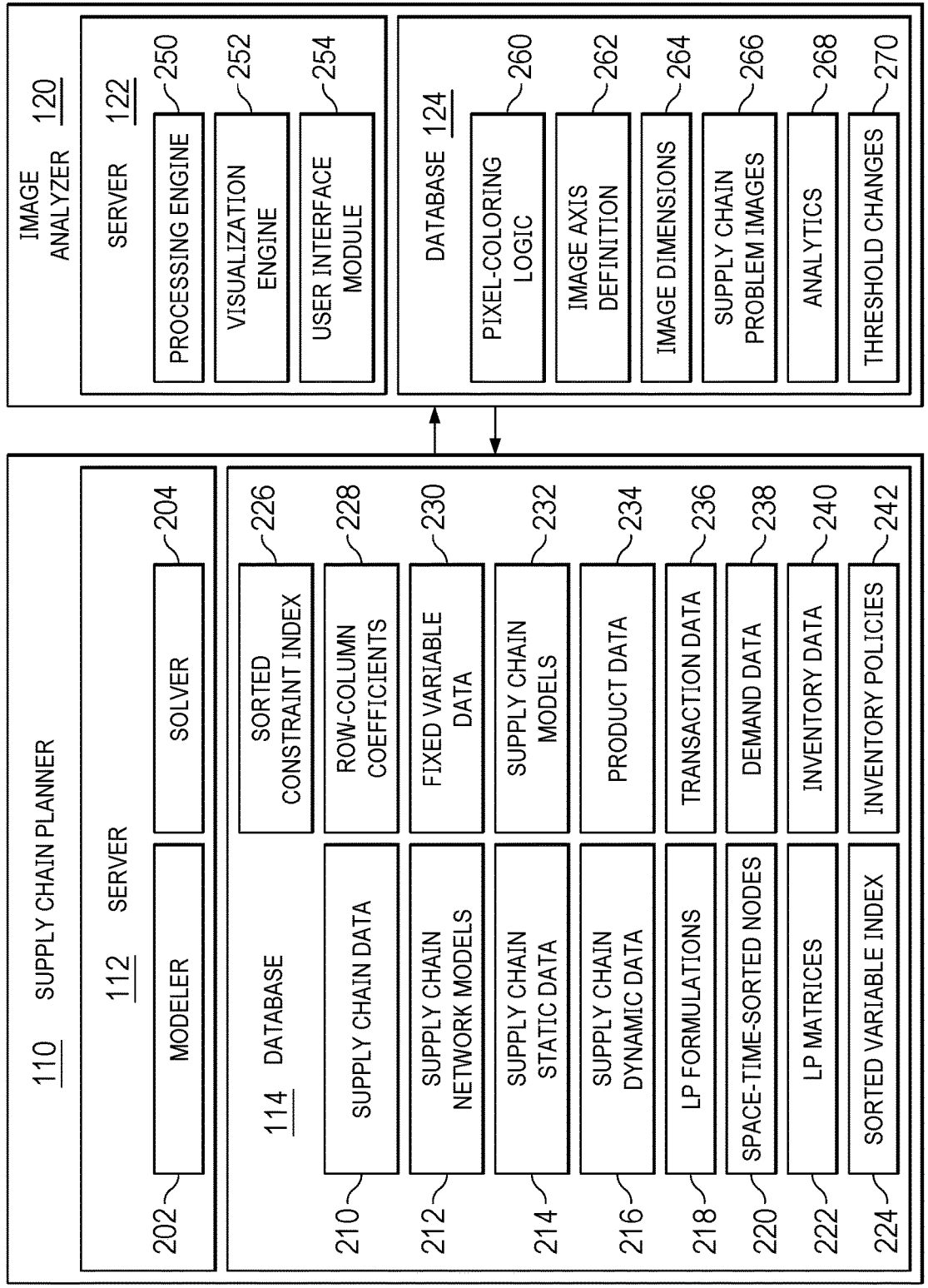
FIG. 2 illustrates the supply chain planner and the image analyzer of FIG. 1 in greater detail, according to an embodiment.

FIG. 2 illustrates supply chain planner 110 and image analyzer 120 of FIG. 1 in greater detail, according to an embodiment. As discussed above, supply chain planner 110 may comprise server 112 and database 114. Although supply chain planner 110 is shown as comprising a single server 112 and a single database 114, embodiments contemplate any suitable number of servers or databases internal to, or externally coupled with, supply chain planner 110.

Server 112 of supply chain planner 110 may comprise modeler 202 and solver 204. Although server 112 is shown and described as comprising a single modeler 202 and a single solver 204, embodiments contemplate any suitable number or combination of one or more modelers and solvers located at one or more locations, local to, or remote from supply chain planner 110, such as on one or more servers or one or more computers 170 at any location in supply chain network 100. Database 114 of supply chain planner 110 may comprise one or more databases or other data storage arrangement at one or more locations, local to, or remote from, server 112. Database 114 comprises, for example, supply chain data 210, supply chain network models 212, supply chain static data 214, supply chain dynamic data 216, LP formulations 218, space-time-sorted nodes 220, LP matrices 222, sorted variable index 224, constraint index 226, row-column coefficients 228, fixed variable data 230, supply chain models 232, product data 234, transaction data 236, demand data 238, inventory data 240, and inventory policies 242. Although, database 114 is shown and described as comprising supply chain data 210, supply chain network models 212, supply chain static data 214, supply chain dynamic data 216, LP formulations 218, space-time-sorted nodes 220, LP matrices 222, sorted variable index 224, constraint index 226, row-column coefficients 228, fixed variable data 230, supply chain models 232, product data 234, transaction data 236, demand data 238, inventory data 240, and inventory policies 242, embodiments contemplate any suitable number or combination of these, located at one or more locations, local to, or remote from, supply chain planner 110 according to particular needs.

Modeler 202 of server 112 models one or more supply chain planning problems of supply chain network 100. According to embodiments, modeler 202 of server 112 models a single- or multi-period supply chain planning problem of supply chain network 100. Modeler 202 identifies resources, operations, buffers, and pathways of supply chain data 210 and maps supply chain network 100 as supply chain network models 212.

According to embodiments, solver 204 of server 112 may comprise one or more optimization, heuristic, or mathematical solvers that generates a solution to the supply chain planning problem. In one embodiment, solvers 204 comprise one or more supply chain planning solvers (such as, for example, an LP solver, a MAP solver, a Deep Tree solver, and the like), construct LP matrices 222 representing the static structure and dynamic properties of supply chain network 100, and generate a solution, plan, cost, or other output.

As an example only and not by way of limitation, database 114 stores supply chain data 210, which comprises any data of one or more supply chain entities 160 including, for example, decision variables, business constraints, goals, and objectives of one or more supply chain entities 160. According to some embodiments, supply chain data 210 comprises hierarchical objectives specified by, for example, business rules, master planning requirements, scheduling constraints, and discrete constraints, including, for example, sequence dependent setup times, lot-sizing, storage, shelf life, and the like.

Supply chain network models 212 represent the flow of materials through one or more supply chain entities 160 of supply chain network 100. In on embodiment, supply chain network models 212 comprise a network of nodes and edges. The material storage and/or transition units are modelled as nodes, which may be referred to as, for example, buffer nodes, buffers, or nodes. Each node may represent a buffer for an item (such as, for example, a raw material, intermediate good, finished good, component, and the like), resource, or operation (including, for example, a production operation, assembly operation, transportation operation, and the like). Each edge may represent the flow, transportation, or assembly of materials (such as items or resources) between the nodes. A planning horizon may be broken down into elementary time-units, such as, for example, time-buckets, or, simply, buckets. The edge between nodes for different buffers or operations may denote processing of material and the edge between nodes for the same buffer or operation (e.g. an edge between a buffer node in one bucket and the same buffer node in a different bucket) may indicate inventory carried forward. Although supply chain network models 212 are shown and described as comprising a network of nodes and edges, embodiments contemplate supply chain network models 212 comprising any suitable model that represents one or more components of supply chain network 100, according to particular needs. In addition, supply chain network models 212 may represent both supply chain static data 214 and supply chain dynamic data 216. The material buffers, resource buffers, and operation nodes of supply chain network models 212 represent the supply chain static structure, which is stored as supply chain static data 214. Changes to the supply chain static structure represents, for example, the addition or removal of one or more supply chain entities 160 (such as, for example, adding or removing one or more manufacturers 164), supply chains of different customers, various configurations of one or more supply chains, and other like structural information. Supply chain dynamic data 216 comprises one or more resource, material, operation, flow-balance, or capacity constraints, such as, for example, lead times, yield rates, inventory levels, safety stock, demand dates, and the like. Flow-balance constraints for most, if not every buffer in every bucket, model the material movement in supply chain network 100. According to some embodiments, supply chain network models 212 represent supply chain dynamic data 216 as values next to the buffers and operations.

LP formulations 218 comprise one or more mathematical formulations representing one or more LP supply chain planning problems. Modeler 202 generates LP formulations 218 of supply chain planning problems, such as, for example, one or more single- or multi-objective LP supply chain planning problems. According to some embodiments, LP formulations 218 comprise mathematical objective functions that represent business objectives, such as, for example, minimizing the quantity of unmet demand, minimizing usage of alternate resources (e.g. maximizing usage of primary resources), planning items as just-in-time (JIT) as possible (e.g. minimizing the amount of carried-over items), and the like. LP formulations 218 additionally comprise mathematical constraints representing limitations to capacity, materials, lead times, and the like, as well as minimum and maximum values for decision variables representing lower and upper bounds. By way of example only and not of limitation, the lower and upper bounds for the capacity of a machine may be set at zero hours and ten hours, respectively. In this example, zero hours comprises the lower bound (because a machine cannot be used for a negative period of time) and ten hours represents a maximum number of hours the machine may be used in a day.

Space-time sorted nodes 220 comprise an ordered arrangement of nodes of one or more supply chain entities 160. Space-Time sorted nodes 220 may be ordered or sorted for a particular supply chain entity at a particular location for a given time bucket and stored in ascending or descending orders of time and/or supply chain location (upstream to downstream or downstream to upstream), or other suitable orders.

LP matrices 222 are single- or multi-period matrices comprising the constraints, the variables, and the coefficients of one or more LP supply chain planning problems. In one embodiment, LP matrices 222 are one or more LP constraint-variable matrices, which comprise a sparse matrix having constraints expressed by rows, variables represented by columns, and coefficients of each variable of a constraint identified by the value of the element intersecting the variable column with the constraint row. In addition or as an alternative, LP matrices 222 may comprise one or more additional rows or columns in the same matrix, one or more additional matrices, one or more submatrices, and the like, which store other components associated with an LP problem, such as, for example, objectives, lower/upper bounds, right-hand-side (RHS) values, and the like, according to particular needs.

According to embodiments, image analyzer 120 generates sorted variable index 224 and constraint index 226, using one or more indexing schemes, which may include, for example, time-based indexing, LP-based indexing, time bucket and variable (Tb+Var) indexing, and the like, as described in further detail below. Row-column coefficients 228 comprise the value of the coefficient for each row and column which indicates the coefficients of the variable represented by a particular column with the constraint represented by a particular row.

A hierarchical multi-objective LP supply chain planning problem has higher objectives (having a higher priority) and lower objectives (having a lower priority). When solving the hierarchical multi-objective LP supply chain planning problem, solver 204 prioritizes solving for higher objectives before lower objectives. To preserve the optimality of the higher objectives when solving for one or more lower objectives, solver 204 calculates a reduced cost to determine whether one or more decision variables should be fixed at their upper or lower bounds (which may be referred to as variable fixing). As described in further detail below, fixed variable data 230 comprises the identity and values of one or more fixed variables.

Supply chain models 232 of database 114 comprise characteristics of a supply chain setup to deliver the customer expectations of a particular customer business model. These characteristics may comprise differentiating factors, such as, for example, MTO (Make-to-Order), ETO (Engineer-to-Order) or MTS (Make-to-Stock). However, supply chain models 232 may also comprise characteristics that specify the supply chain structure in even more detail, including, for example, specifying the type of collaboration with the customer (e.g. Vendor-Managed Inventory (VMI)), from where products may be sourced, and how products may be allocated, shipped, or paid for, by particular customers. Each of these characteristics may lead to different supply chain models 232.

Product data 234 of database 114 comprises one or more data structures for identifying, classifying, and storing data associated with products, including, for example, a product identifier (such as a Stock Keeping Unit (SKU), Universal Product Code (UPC), or the like), product attributes and attribute values, sourcing information, and the like. Product data 234 may comprise data about one or more products organized and sortable by, for example, product attributes, attribute values, product identification, sales volume, demand forecast, or any stored category or dimension. Attributes of one or more products may be, for example, any categorical characteristic or quality of a product, and an attribute value may be a specific value or identity for the one or more products according to the categorical characteristic or quality, including, for example, physical parameters (such as, for example, size, weight, dimensions, fill level, color, and the like).

Transaction data 236 of database 114 may comprise, for example, any data relating to past sales, purchase data, promotions, events, or the like of one or more supply chain entities 160. In addition, transaction data 236 is represented by any suitable combination of values and dimensions, aggregated or un-aggregated, such as, for example, sales per week, sales per week per location, sales per day, sales per day per season, or the like.

Demand data 238 may cover a time interval such as, for example, by the minute, hour, daily, weekly, monthly, quarterly, yearly, or any suitable time interval, including substantially in real time. According to embodiments, demand data 238 may include historical demand data or projected demand forecasts for one or more retail locations, customers, regions, or the like of one or more supply chain entities 160. Demand data 238 may be segmented according to product attributes, customers, regions, or the like.

Inventory data 240 of database 114 may comprise any data relating to current or projected inventory quantities or states, order rules, or the like. For example, inventory data 240 may comprise the current level of inventory for each item at one or more stocking locations across supply chain network 100. In addition, inventory data 240 may comprise order rules that describe one or more rules or limits on setting an inventory policy, including, but not limited to, a minimum order quantity, a maximum order quantity, a discount, a step-size order quantity, and batch quantity rules.

According to some embodiments, supply chain planner 110 accesses and stores inventory data 240 in database 114, which may be used by supply chain planner 110 to place orders, set inventory levels at one or more stocking points, initiate manufacturing of one or more items (or components of one or more items), or the like, in response to, and based at least in part on, a supply chain plan, a visualization of supply chain planning problems, analytics, or other output of supply chain planner 110 or image analyzer 120. In addition, or in the alternative, inventory data 240 may be updated by receiving current item quantities, mappings, or locations from inventory system 130, transportation network 140, one or more imaging devices 150, and/or one or more supply chain entities 160.

Inventory policies 242 of database 114 may comprise any suitable inventory policy describing the reorder point and target quantity, or other inventory policy parameters that set rules for supply chain planner 110 to manage and reorder inventory. Inventory policies 242 may be based on target service level, demand, cost, fill rate, or the like. According to embodiments, inventory policies 242 comprise target service levels that ensure that a service level of one or more supply chain entities 160 is met with a certain probability. For example, one or more supply chain entities 160 may set a target service level at 95%, meaning one or more supply chain entities 160 will set the desired inventory stock level at a level that meets demand 95% of the time. Although, a particular target service level and percentage is described; embodiments contemplate any target service level, for example, a target service level of approximately 99% through 90%, 75%, or any target service level, according to particular needs. Other types of service levels associated with inventory quantity or order quantity may comprise, but are not limited to, a maximum expected backlog and a fulfillment level. Once the service level is set, supply chain planner 110 may determine a replenishment order according to one or more replenishment rules, which, among other things, indicate to one or more supply chain entities 160 to send, move, or receive inventory to replace the depleted inventory.

As discussed above, image analyzer 120 may comprise server 122 and database 124. Although image analyzer 120 is shown as comprising a single server 122 and a single database 124, embodiments contemplate any suitable number of servers or databases internal to or externally coupled with image analyzer 120.

Server 122 of image analyzer 120 may comprise image processing engine 250, visualization engine 252, and user interface module 254. Although server 122 is shown and described as comprising a single image processing engine 250, a single visualization engine 252, and a single user interface module 254, embodiments contemplate any suitable number or combination of these located at one or more locations, local to, or remote from image analyzer 120, such as on multiple servers or one or more computers 170 at any location in supply chain network 100. Database 124 of image analyzer 120 may comprise one or more databases or other data storage arrangement at one or more locations, local to, or remote from, server 122. Database 124 comprises, for example, pixel-coloring logic 260, image axis definition 262, image dimension 264, supply chain problem images 266, analytics 268, and threshold changes 270. Although database 124 is shown and described as comprising pixel-coloring logic 260, image axis definition 262, image dimension 264, supply chain problem images 266, analytics 268, and threshold changes 270, embodiments contemplate any suitable number or combination of these, located at one or more locations, local to, or remote from, image analyzer 120, according to particular needs.

As described in further detail below, processing engine 250 of image analyzer 120 receives LP matrices 222 for a supply chain planning problem, time-space sorting of constraints and variables, and functional identification of variables and rows. Visualization engine 252 generates supply chain problem images 266 using pixel-coloring logic 260 to color pixels according to the function of the variable or constraint and/or row-column coefficients 228. As described in further detail below, visualization engine 252 generates supply chain problem images 266 comprising domain-aware color-coding and categorization of the image elements to present insights into supply chain structure and complexity. In addition, or as an alternative, visualization engine 252 generates supply chain problem images 266 comprising black and white image that identify supply chain components and connecting flows among them for a given supply chain structure.

User interface module 254 of image analyzer 120 generates and displays a user interface, such as, for example, a graphical user interface (GUI), that displays one or more interactive visualizations of supply chain problem images 266 and analytics 268. According to embodiments, user interface module 254 displays a GUI comprising interactive graphical elements for selecting one or more supply chain network components, formulating the supply chain planning problem, selecting one or more LP matrices 222, and generating the visualizations of supply chain problem images 266 and analytics 268 for one or more supply chain planning problems. Embodiments further contemplate processing engine 250, visualization engine 252, and user interface module 254 integrated with supply chain planner 110 to enable hierarchical master planning with business objective-wise analytics to provide comparison and insight of the optimization problem without the complexity of mathematical formulae and interpretation and the identification supply chain components that add to complexity and/or components that are critical to different business objectives.

Pixel-coloring logic 260 of database 124 maps each pixel of supply chain problem images 266 to a row and the column in LP matrices 222 using one or more links. According to embodiments, links that map to a non-zero coefficient of row-column coefficients 228 are active; otherwise, links are inactive. Image axis definition 262 aligns constraints and variables of LP matrices 222 with pixels of supply chain problem images 266 using sorted variable index 224 and sorted constraint index 226. Image dimensions 264 determine the dimensions of supply chain problem images 266, which, according to one embodiment are equal to the quantity of constraints and the quantity of variables in LP matrices 222. By analyzing supply chain problem images 266, processing engine 250 generates analytics 268. User interface module 254 may display analytics 268 by interactive dashboards that reveal complex information intuitively using visualizations of supply chain problem images 266, refreshing visualizations based on filters of variables and constraints (which, for example, may be used to illustrate placement of a high-impact product), refreshing visualizations based on cutoff criteria (which, for example, may be used to illustrate simplification of a supply chain when processes with yields below a particular selected value are removed from consideration, tracing of a supply path, and other like insights.

In one embodiment, visualization engine 250 colors pixels using pixel-coloring logic 260, as disclosed above. In addition, or as an alternative, visualization engine 250 colors pixels, based, at least in part, on the value of row-column coefficients 228. In one embodiment, visualization engine 250 colors pixels color when the value of row-column coefficients 228 satisfies one or more threshold values. By way of example only and not by way of limitation, threshold values indicate a minimum, a maximum, a range, or other suitable value or values that determine pixel color based on the value (or absolute value) of row-column coefficients 228. By way of example only and not by way of limitation, when an absolute value of row-column coefficients 228 is less than a selected threshold value, visualization engine 250 does not plot the associated pixel, otherwise the pixel is colored according to its constraint or variable type. In addition, visualization engine 250 receives threshold changes 270 comprising modifications to the threshold values. In response to receiving threshold changes 270, visualization engine 250 updates supply chain problem images 266 by removing, adding, or differently coloring pixels, according to the value of row-column coefficients 228 and the new threshold values.

Figure 3:
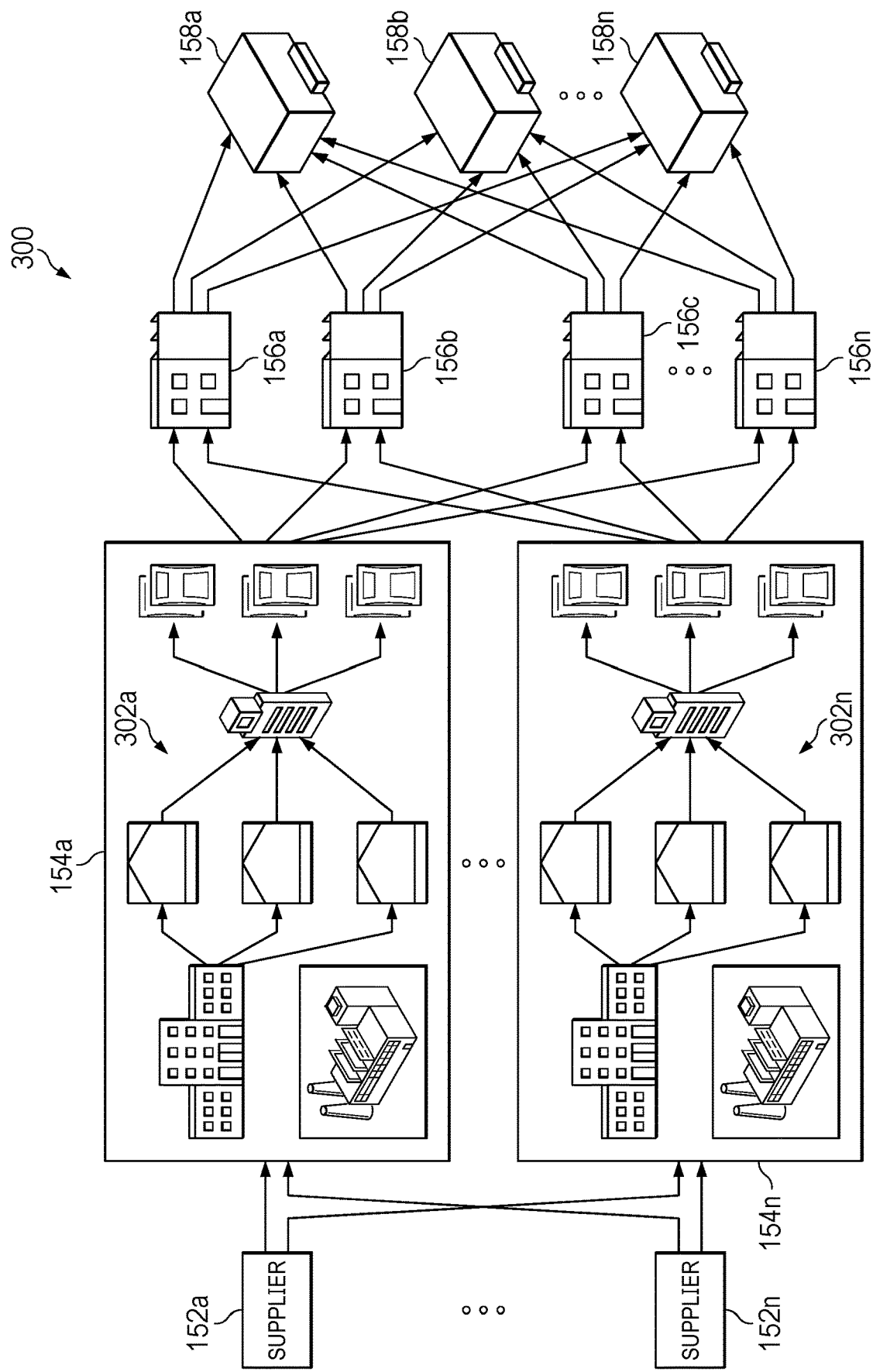
FIG. 3 illustrates a simplified supply chain network, according to a first embodiment.

FIG. 3 illustrates simplified supply chain network 300, according to an embodiment. Simplified supply chain network 300 comprises two or more suppliers 162a-162n, two or more manufacturers 164a-164n, four or more distribution centers 166a-166n, and three or more retailers 168a-168n. Two or more manufacturers 164a-164n receive items from two or more suppliers 162a-162n for production processes 302a-302n. Production processes 302a-302n comprise various operations for processing items, intermediate items, and finished goods, which may comprise one or more products transported to four or more distribution centers 166a-166n. Four or more distribution centers 166a-166n may transport products to three or more retailers 168a-168n. The flow of materials, items, and products among the two or more suppliers 162a-162n, two or more manufacturers 164a-164n, four or more distribution centers 166a-166n, and three or more retailers 168a-168n of simplified supply chain network 300 must meet demand requirements while being limited by constraints of capacity, materials, lead times, transportation, sourcing, and/or the like. Although simplified supply chain network 300 is illustrated as comprising two or more suppliers 162a-162n, two or more manufacturers 164a-164n, four or more distribution centers 166a-166n, and three or more retailers 168a-168n, supply chain network 100 may comprise any number of one or more supply chain entities 160, according to particular needs. For example, supply chain network 100 often comprises multiple manufacturing plants located in different regions or countries. In addition, an item may be processed from many materials by many operations into a large number of different intermediate goods and/or finished items, where the different operations may have multiple constrained resources and multiple input items, each with their own lead, transportation, production, and cycle times. Additionally, materials and resources may flow upstream, downstream, or both, subject to material and capacity constraints and demand requirements.

Figure 4:
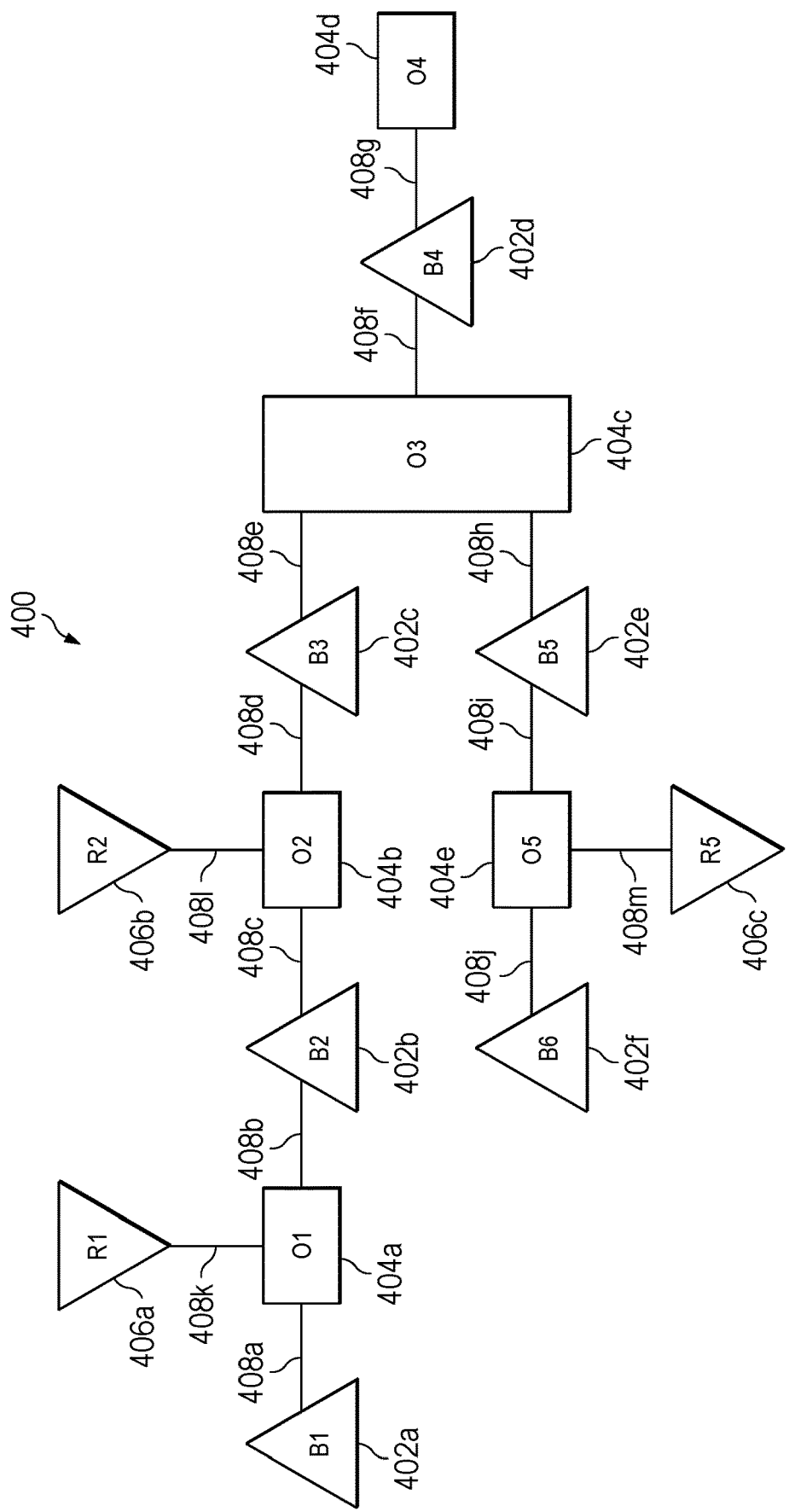
FIG. 4 illustrates a simplified supply chain network, according to a second embodiment.

FIG. 4 illustrates simplified supply chain network 400, according to an embodiment. Modeler 202 models simplified supply chain network 400 to generate one or more supply chain network models 212 representing the flow of items and resources between nodes. In one embodiment, modeler 202 creates a supply chain network model representing the flow of items and resources between nodes, in accordance with the constraints at each operation and buffer. As disclosed above, items may comprise, for example, components, materials, products, parts, supplies, or other items. In one embodiment, items flow from upstream nodes to downstream nodes along edges from left to right. This flow may represent, for example, raw materials at upstream nodes being transformed into finished products at downstream nodes. However, flows may be bidirectional, and one or more items may flow from right to left, from a downstream node to an upstream node, according to particular needs. According to one embodiment, simplified supply chain network 400 comprises six material buffers (B1-B6) 402a-402f storing items, five operations (O1-O5) 404a-404e for processing items, and three resource buffers (R1, R2, and R5) 406a-406c, which represent capacity limitations on each of the operations to which they are connected. Four operations (O1, O2, O4, O5) 404a-404d have a single item as input and a single item as output. A single operation (O3) 404c requires two items as input (i.e. materials or items stored at buffers B3 402c and B5 402e) and produces a single item as output (materials or items stored at buffer B4).

By way of example only and not of limitation, supply chain network 400 stores raw materials at the most upstream material buffers (B1 and B6) 402a and 402f. Material buffers (B1 and B6) 402a and 402f may receive raw materials as the initial input for a manufacturing process. Raw materials may comprise, for example, metal, fabric, adhesives, polymers, and other materials and compounds used during manufacturing. The flow of raw materials from materials buffers (B1 and B6) 402a and 402f is indicated by edges 408a and 408j, which identify operations (O1 and O5) 404a and 404e as a possible destination for the raw materials. Operations (O1 and O5) 404a and 404e may comprise production processes that receive raw materials and produce one or more intermediate items, which are then stored at material buffers (B2 and B5) 402b and 402e as indicated by edges 408b and 408i. Operations (O1 and O5) 404a and 404e are additionally coupled by edges 402a and 402c with resource buffers (R1 and R5) 406a and 406c to indicate that operations (O1 and O5) 404a and 404e require the resources from resource buffers (R1 and R5) 406a and 406c to process raw materials stored at the most upstream material buffers (B1 and B6) 402a and 402f into intermediate items stored at material buffers (B2 and B5) 402b and 402e. According to embodiments, resources represented by resource buffers (R1 and R5) 406a and 406c may include, for example, equipment or facilities for manufacturing, distribution, or transportation. Although resource buffers (R1 and R5) 406a and 406c are described as comprising equipment or facilities for manufacturing, distribution, or transportation, embodiments contemplate any number of one or more resource buffers representing other suitable resources utilized in supply chain operations, according to particular needs.

According to embodiments, edges 408a-408j and 410a-410c represent limitations on supplying items to particular buffers including, but not limited to, for example, transportation limitations (such as, for example, cost, time, available transportation options) or outputs of various operations (such as, for example, different production processes, which produce different items, each of which may be represented by a different SKU, and which each may be stored at different buffers). For the simplified supply chain network 400, transportation processes may transport, package, or ship intermediate and finished goods to one or more locations internal to or external of one or more supply chain entities 160 of supply chain network 100, including, for example, shipping directly to consumers, to regional or strategic distribution centers, or to the inventory of one or more supply chain entities 160, including, for example, to replenish a safety stock for one or more items in an inventory of one or more supply chain entities 160. Additionally, particular items and operations described herein comprise a simplified description for the purpose of illustration. Items may, for example, comprise different sizes, styles, or states of a same or a different item. Similarly, an operation may be any process or operation, including manufacturing, distribution, transportation, or any other suitable action of the supply chain network. Although the limitation of the flow of items between nodes of simplified supply chain network 400 is described as cost, timing, transportation, or production limitations, embodiments contemplate any suitable flow of items (or limitations of the flow of items) between any one or more different nodes of simplified supply chain network 400, according to particular needs. In one embodiment, simplified supply chain network 400 includes additional constraints, such as, for example, business constraints, operation constraints, and resource constraints, which facilitate one or more other planning rules. Although simplified supply chain network 400 is shown and described as having a particular number and configuration of material buffers 402a-402f, operations 404a-404e, resource buffers 406a-406c, and edges 408a-408j and 410a-410c, embodiments contemplate any number of buffers, resources, operations, and edges with any suitable flow between them, according to particular needs.

In addition, or in the alternative, supply chain planner 110 may model a supply chain planning problem with time-buckets to provide efficient and almost-accurate modelling of various process lead times, material and capacity constraints, and demand requirements. To create a time-bucketed supply chain planning problem, supply chain network 100 models the flow of materials and resources between the supply chain entities in accordance with the constraints at each time bucket.

Figure 5:
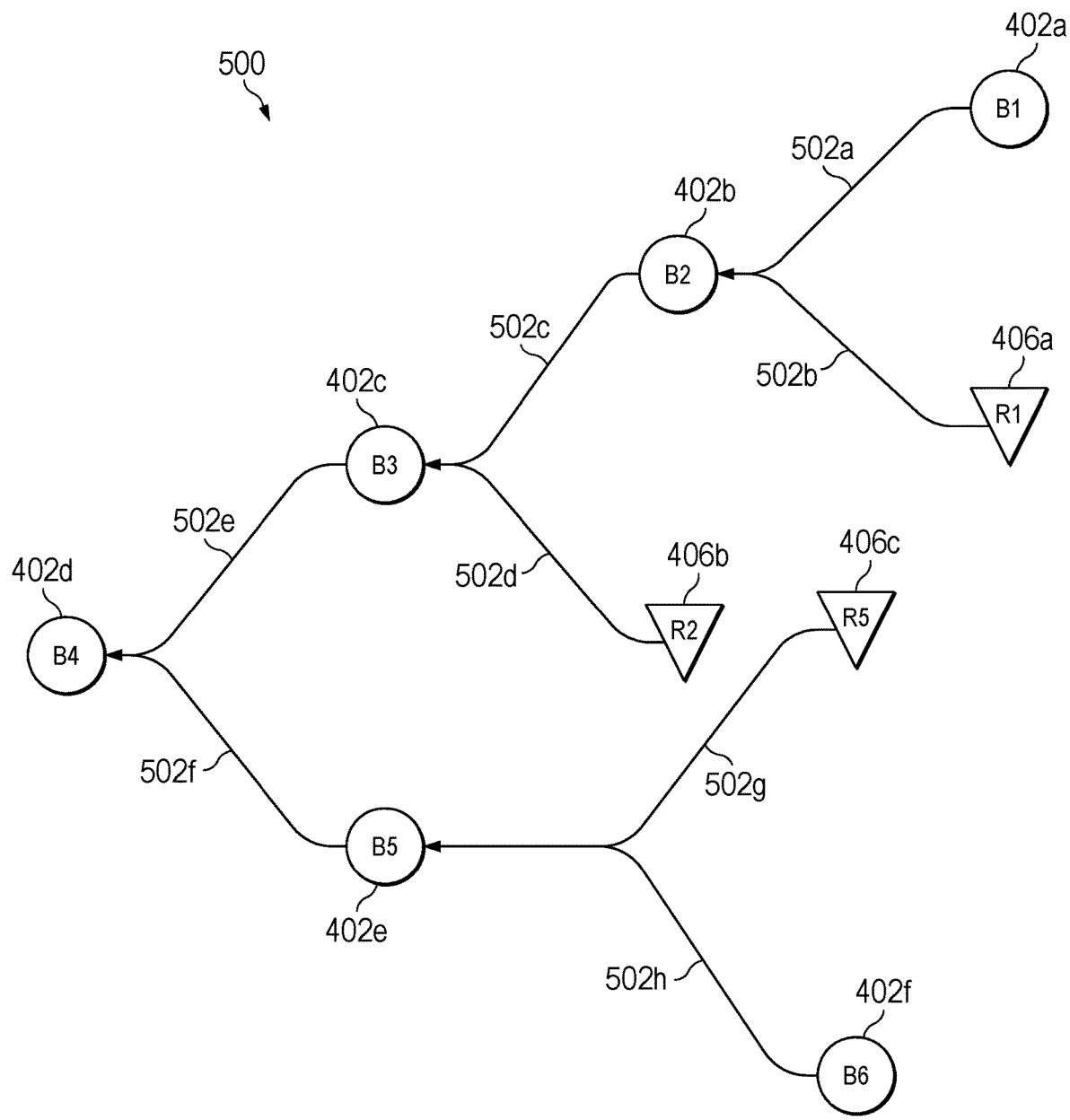
FIG. 5 illustrates a supply chain graph representing the simplified supply chain network of FIG. 4, according to an embodiment.

FIG. 5 illustrates supply chain graph 500 representing simplified supply chain network 400 of FIG. 4, according to an embodiment. Supply chain graph 500 comprises a modeled graph of simplified supply chain network 400. Supply chain graph 500 comprises a model of nodes and edges, wherein nodes represent material and resource buffers and edges represent consuming, producing, or loading an item or resource.

Supply chain graph 500 comprises material buffer nodes 402a-402f (B1, B2, B3, B4, B5, and B6), which indicate a particular item at a particular location in supply chain network 100. Material buffer nodes 402a-402f correspond to storage constraints of material buffer nodes 402a-402f of simplified supply chain network 400. Resource buffer nodes 406a-406c (R1, R2, and R5) indicate a resource having a particular capacity, such as, for example, transportation, manufacturing, or other activities, and correspond to resource buffer nodes 406a-406c of simplified supply chain network 400. Each of edges 502a-502h represent consumption, production, or loading of an item or resource from one or more material buffer nodes 402a-402f or one or more resource buffer nodes 406a-406c to one or more other material buffer nodes 402a-402f or resource buffer nodes 406a-406c. Each of edges 502a-502h may comprise a weight corresponding to the number of units of material or resource consumed for each unit of material produced. By way of example only and not by way of limitation, edges 502a-502b connecting material buffer node (B1) 402a and resource buffer node (R1) 406a to material buffer node (B2) 402b, indicate that a supply of materials from material buffer (B1) 402a and a capacity of a resource at resource buffer (R1) 406a are consumed to generate the material represented by material buffer (B2) 402b.

Figure 6:
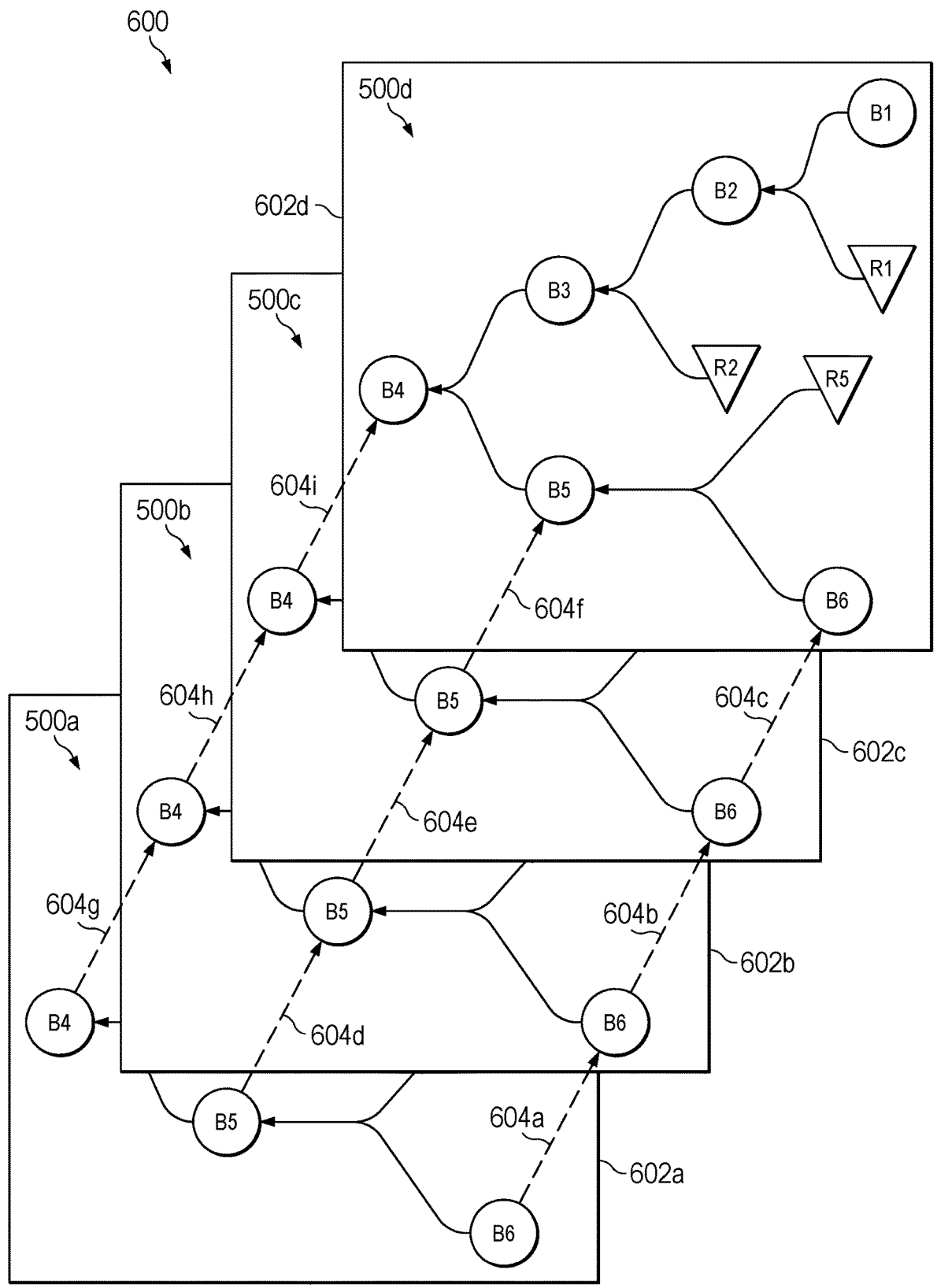
FIG. 6 illustrates a multi-period supply chain graph, according to an embodiment.

FIG. 6 illustrates multi-period supply chain graph 600, according to an embodiment. Multi-period supply chain graph 600 comprises a graphical representation of a multi-period supply chain data model. Multi-period supply chain graph 600 comprises a planning horizon divided into time buckets, represented by leaves 602a-602d. Each of leaves 602a-602d comprise one single-period supply chain graph 500a-500d. Arcs 604a-604i crossing between leaves 602a-602d represent materials and resources flowing between nodes of different time buckets. For example, arcs 604a-604i between material buffer nodes 502a-502f and resource buffer nodes 504a-504c in different time buckets represent materials and resources flowing from a node in one time bucket to a node in another time bucket. The flow of materials and resources between nodes in different time buckets indicates the time needed to complete the operation (such as, for example, to transform a first item into a different item, transport an item at a first location to the same item at a second location, and other like operations) is longer than the time period represented by the time bucket. Multi-period supply chain graph 600 comprises a planning horizon with four time buckets and three time bucket boundaries. A planning horizon is the duration of the time period covered by the supply chain planning problem, such as, for example, one year. The planning horizon is divided into discrete time periods referred to as time buckets, which may comprise, for example, daily buckets, weekly buckets, monthly buckets, quarterly buckets, or the like. Although the planning horizon is described as one year and the time buckets are described as daily buckets, weekly buckets, monthly buckets, or quarterly buckets, embodiments contemplate a planning horizon comprising any suitable planning period divided into any number of time buckets having time periods of any suitable duration, according to particular needs.

Figure 7:
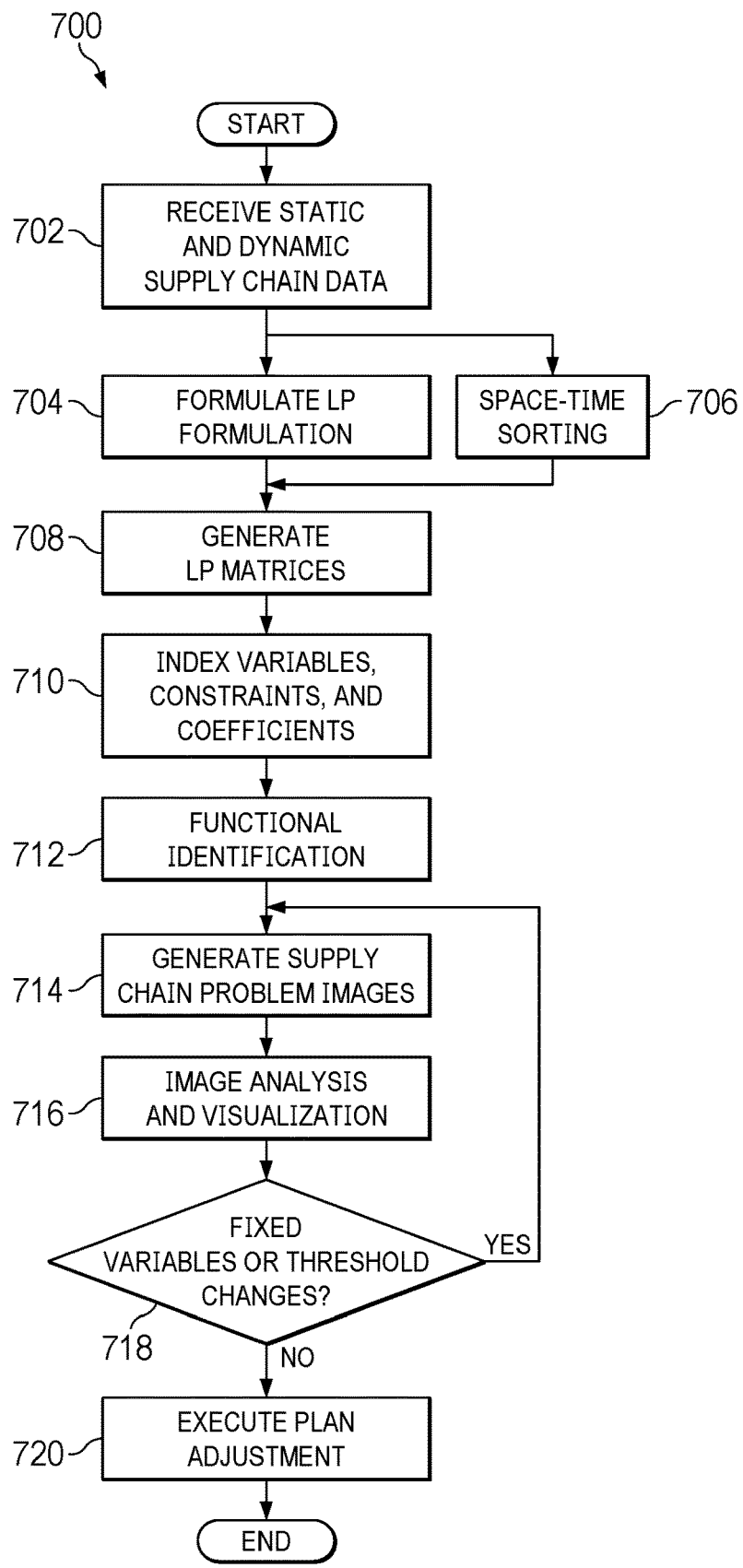
FIG. 7 illustrates image analytics method, according to an embodiment.

FIG. 7 illustrates image analytics method 700, according to an embodiment. Method 700 proceeds by one or more activities, which although described in a particular order, may be performed in one or more permutations, according to particular needs.

Method 700 begins at activity 702, where solver 204 of supply chain planner 110 receives supply chain static data 214 and supply chain dynamic data 216. By way of explanation only and not by way of limitation, an example of image analytics method 700 is described in connection with workflow 800.

Figure 8:
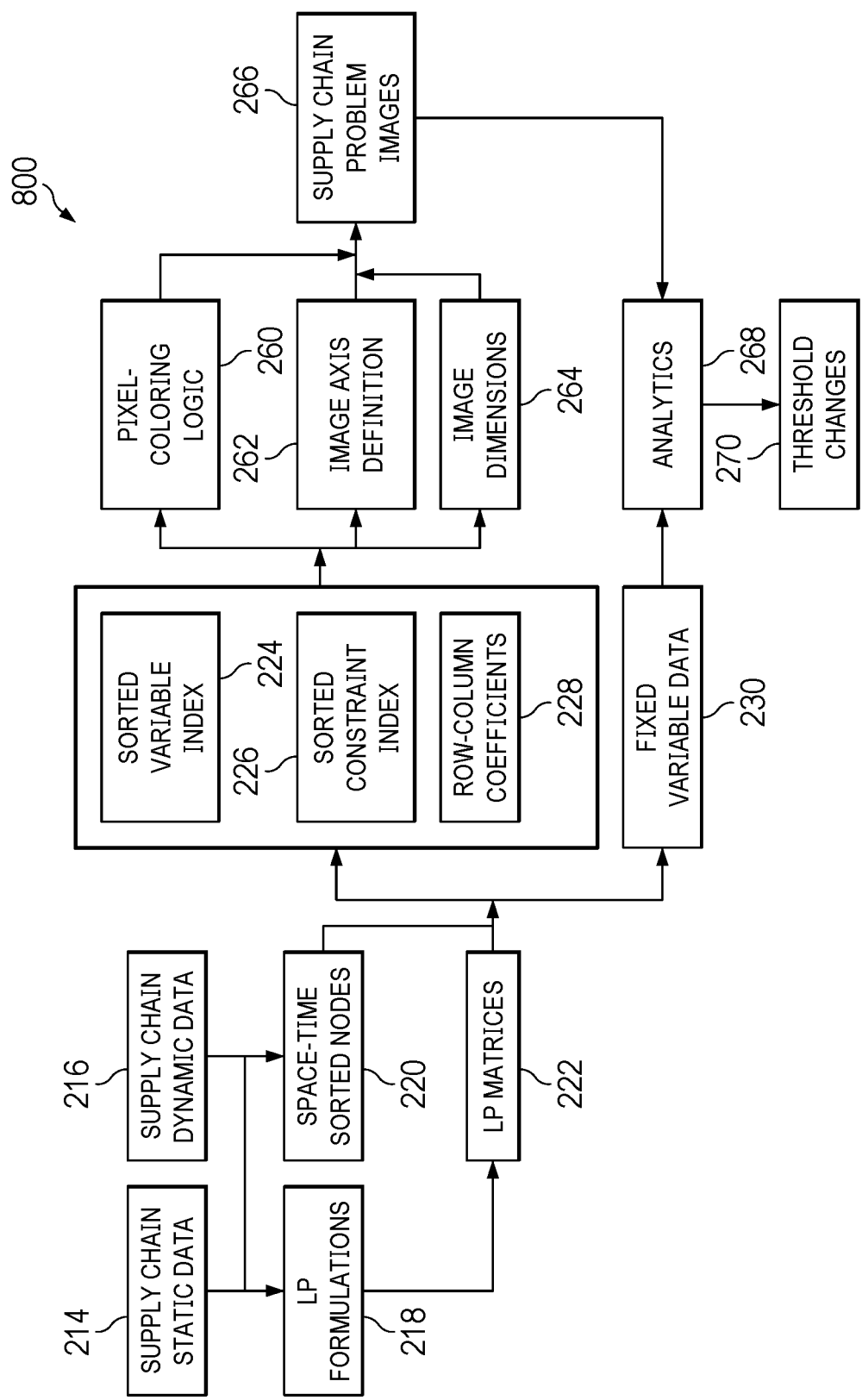
FIG. 8 illustrates a workflow of the image analytics method of FIG. 7, according to an embodiment.

FIG. 8 illustrates workflow 800 of image analytics method 700 of FIG. 7, according to an embodiment. Workflow 800 illustrates processing the structures of various data (such as, for example, mappings, matrices, calculated values, solutions, images, and the like) according to one embodiment of image analytics method 700. For example, as disclosed above at activity 702, solver 204 receives supply chain static data 214 and supply chain dynamic data 216, as shown on workflow 800. Using the received supply chain static data 214 and supply chain dynamic data 216, modeler 204 generates LP formulations 218 activity 704 and space-time-sorted nodes 216 at activity 706. More specifically, at activity 704, modeler 202 generates LP formulations of supply chain planning problems, such as, for example, one or more single- or multi-objective LP supply chain planning problems, and at activity 706, modeler 202 generates space-time sorted nodes 220, which represent nodes of a supply chain entity, such as, for example, a buffer, a capacity, a manufacturing/distribution process, at some location for a given time bucket stored in an ascending or descending order of time and location within the supply chain.

At activity 708, solver 204 receives LP formulations 218 and generates LP matrices 222. As disclosed above, LP matrices 222 are single- or multi-period matrices comprising the constraints, the variables, and the coefficients of one or more LP supply chain planning problems, which, in addition or as an alternative, may comprise one or more additional rows or columns in the same matrix, one or more additional matrices, one or more submatrices, and the like, which store other components associated with an LP problem, such as, for example, objectives, lower/upper bounds, right-hand-side (RHS) values, and the like, according to particular needs.

After receiving one or more space-time sorted nodes 220 and one or more LP matrices 222, processing engine 250 generates sorted variable index 224, sorted constraint index 226, and row-column coefficients 228, at activity 710. According to embodiments, image analyzer 120 may use one or more of various indexing schemes, including, time-based indexing, where for each time bucket i=1 . . . T, each of the supply chain elements are collected (such as, for example, Op1T1, Op2T1, Op3T1, Op1T2, Op2T2, Op3T2, etc.); an LP-based indexing, where the indexed location is based on what the LP assigns to supply chain elements; and a time-bucket-variable indexing, where, for each supply chain element Op1, Op2, Op3, time is indexed bucket-wise (such as, for example, Op1T1, Op1T2, Op2T1, Op2T2, Op3T1, Op3T2, etc.). Although particular indexing schemes are shown and described, embodiments contemplate any suitable indexing scheme, according to particular needs. According to an embodiment, processing engine 250 generates sorted variable index 224, sorted constraint index 226, row-column coefficients 228 by generating sparse pairs (e.g. constraint-variable or row-column pairs) for each variable present in each constraint. For example, if a first constraint (e.g. const1) equals the sum of a first variable having a first coefficient (e.g. 1.2*var1) and a second variable having a second coefficient (e.g. 1.4*var2), then processing engine 250 generates two constraint-variable pairs (e.g. const1-var1, const1-var2). After generating the sparse pairs, processing engine 250 stores the values of the coefficients as row-column coefficients 228 the indexed variable and constraint locations, determined by the indexing scheme, as disclosed above. In one embodiment, processing engine 250 first sorts all variables prior to sorting all constraints and generates the sorted variable index 224 and sorted constraint index 226. Although processing engine 250 is described as first sorting variables prior to sorting constraints to generate sorted sparse pairs, embodiments contemplate any suitable sorting order or priority, according to particular needs. Visualization engine 252 uses sorted variable index 224 and sorted constraint index 226 to plot row-column coefficients 228 using pixel-coloring logic 260.

At activity 712, processing engine 250 performs functional identification of variables and constraints. When creating sparse pairs of row-column coefficients 228, processing engine 250 creates sparse pairs comprising the constraint or variable type extracted from the full name of the constraint or variable. For example, a variable named OP000003T001 is an operation variable (OP), whereas a constraint named BAL000004T005 is a flow balance constraint (BAL). Although the functional identification of particular types of constraints and variables are described, embodiments contemplate any suitable number or combination of types of constraints and variables, according to particular needs.

At activity 714, visualization engine 252 generates supply chain problem images 266. According to embodiments, visualization engine 252 receives sorted variable index 224, sorted constraint index 226, and row-column coefficients 228 from processing engine 250 and applies pixel-coloring logic 260 to generate variable-colored, constraint-colored, black-and-white, or other types of supply chain problem images 266. Visualization engine 252 may use an image-axis definition 262 that represents constraints by each row and variables by each column, while image dimensions 264 are determined by the total number of variables and constraints in the LP matrices 222. According to embodiments, image analyzer 120 comprises pixel-coloring logic 260 wherein each coordinate point maps the link between the row and the column in the LP matrices 222. A link is active if there is a non-zero coefficient associated with the link, otherwise it is inactive. An inactive link may be colored black. For active links, various colors may be assigned to each pixel to indicate domain and categorization of the image elements, which provides insights into supply chain structure and complexity.

Embodiments contemplate visualization of supply chain problem images 266 comprising changes in consume yield (parts of supply chain problem image 266 become black or white, or darker or lighter); changes in produce yield (parts of supply chain problem image 266 become black or white, or darker or lighter); changes in material availability (if some upstream buffer WIP becomes zero or infinite, pixels representing those constraints for that buffer become black); and changes in capacity constraints (if the capacity variable becomes zero or infinite, pixels representing related constraints become black). In addition, embodiments contemplate visualization of supply chain problem images 266 with various levels of brightness assigned to different absolute values of the coefficient or changes in yield, images with blackening of balance constraints simulating Work-In-Progress (WIP) shortage at one or more upstream buffers, coloring or displaying as black pixels representing variable resource constraints to simulate resource outage or the variable fixing of hierarchical planning. When performing a time-based decomposition method, variables with a negative coefficient indicate a constraint that is leaving a particular time bucket, whereas variables with a positive constraint indicate a constraint that is entering the time bucket. By color-coding pixels based on the absolute values of the coefficients, supply chain problem images 266 indicate the flow of the variables across different time buckets, which may be used to select one or more locations to decompose the LP supply chain planning problem.

At activity 716, user interface module 254 displays visualizations of supply chain problem images 266 and analytics 268. According to embodiments, user interface module 254 displays visualizations of one or more supply chain problem images 266 to provide image-based insights for understanding LP supply chain planning problems without the interpretation of mathematical formulae. Image analyzer 120 may be integrated with supply chain planner 110 to enable hierarchical master planning with business objective-wise analytics to provide comparison and insight of the optimization problem such as, for example, identification of parts of a supply chain that add to complexity or that are critical to different business objectives. Embodiments contemplate user interface module 254 displaying interactive dashboards comprising sliders, selectors, and input entry to provide selection or modification of variable and constraint filters or threshold changes 270. According to embodiments, one or more sliders provide adjustment of threshold values (i.e. threshold changes 270), which modify the presence and/or coloring of pixels in supply chain problem images 266, based on the value of row-column coefficients 228. In addition, user interface module 254 displays one or more selectors, which provide the selection of variable and/or constraint types that are represented in supply chain problem images 266 and displayed by one or more visualizations, as described in further detail below. According to some embodiments, image analytics 268 comprise a comparison between higher and lower hierarchical objectives of the same multi-objective hierarchical LP problem.

At activity 718, processing engine 250 checks for fixed variable data 230 and/or threshold changes 270. When fixed variables or threshold changes are received, method 700 returns to activity 714, which visualization engine 252 updates supply chain problem images 266 based on the received fixed variable data 230 or threshold changes 270. When image analyzer 120 receives fixed variable data 230, visualization engine 252 updates supply chain problem images 266 in response to hierarchy-preservation activities of solver 204 during multi-objective optimization by removing the sparse pairs for the fixed variables from row-column coefficients 228 at each iteration of the hierarchical solve. During the solve of the multi-objective hierarchical LP problem, solver 204 calculates the reduced cost and updates the upper and lower bounds for the current objective level. When solving the multi-objective LP problem for one or more lower objectives, solver 204 sets decision variables at their upper or lower bounds (which may be referred to as variable fixing) to retain the objective value of one or more higher objectives. Solver 204 may then iteratively repeat solving the multi-objective hierarchical LP problem for each objective following until solver 204 solves all objectives of the multi-objective hierarchical LP problem or one or more stopping criteria are reached.

When processing engine 250 receives threshold changes 270, visualization engine 252 updates supply chain problem images 266 by changing the color of or removing pixels from supply chain problem images 266. For example, by color-coding pixels based on the absolute value of row-column coefficients 228, portions of the supply chain problem image 266 that represent low yields are represented darker than portions where the yield is higher. The darker portions indicate the parts of a supply chain represented by the LP supply chain planning problem of the supply chain problem image have low activity. By using one or more threshold changes 270 applied to pixel-coloring logic 260 for row-column coefficients 228, the differences in darkness or lightness in the supply chain problem image compared with the previous supply chain problem image indicates the effects of density or sparsity or magnitudes of the adjustments of particular thresholds. By way of example only and not by way of limitation, supply chain planner 110 may check whether removing from consideration all processes with yields less than 0.01 would simplify an LP supply chain planning problem by threshold changes 270 that remove all pixels associated with yields less than 0.01 by, for example, representing these pixels as black.

According to embodiments, supply chain planner 110 executes one or more supply chain processes, based on one or more image-based insights from supply chain problem images 266 or analytics 268, at activity 720. According to embodiments, in response to one or more image-based insights from supply chain problem images 266 or analytics 268, supply chain planner 110 executes one or more supply chain processes, such as, for example, instructing automated machinery (i.e., robotic warehouse systems, robotic inventory systems, automated guided vehicles, mobile racking units, automated robotic production machinery, robotic devices and the like) to adjust product mix ratios, inventory levels at various stocking points, production of products of manufacturing equipment, proportional or alternative sourcing of the one or more supply chain entities, and the packaging and quantity of items for shipment based, at least in part, on a supply chain plan, the number of items currently in stock at the one or more stocking locations of one or more supply chain entities 160, the number of items currently in transit in transportation network 140, a forecasted demand, a supply chain disruption, a material or capacity reallocation, projected inventory levels at one or more stocking locations, and/or one or more additional factors described herein.

By way of further explanation only and not by way of limitation, various visualizations showing different types of supply chain problem images 266 are described in the following examples.

Figure 9:
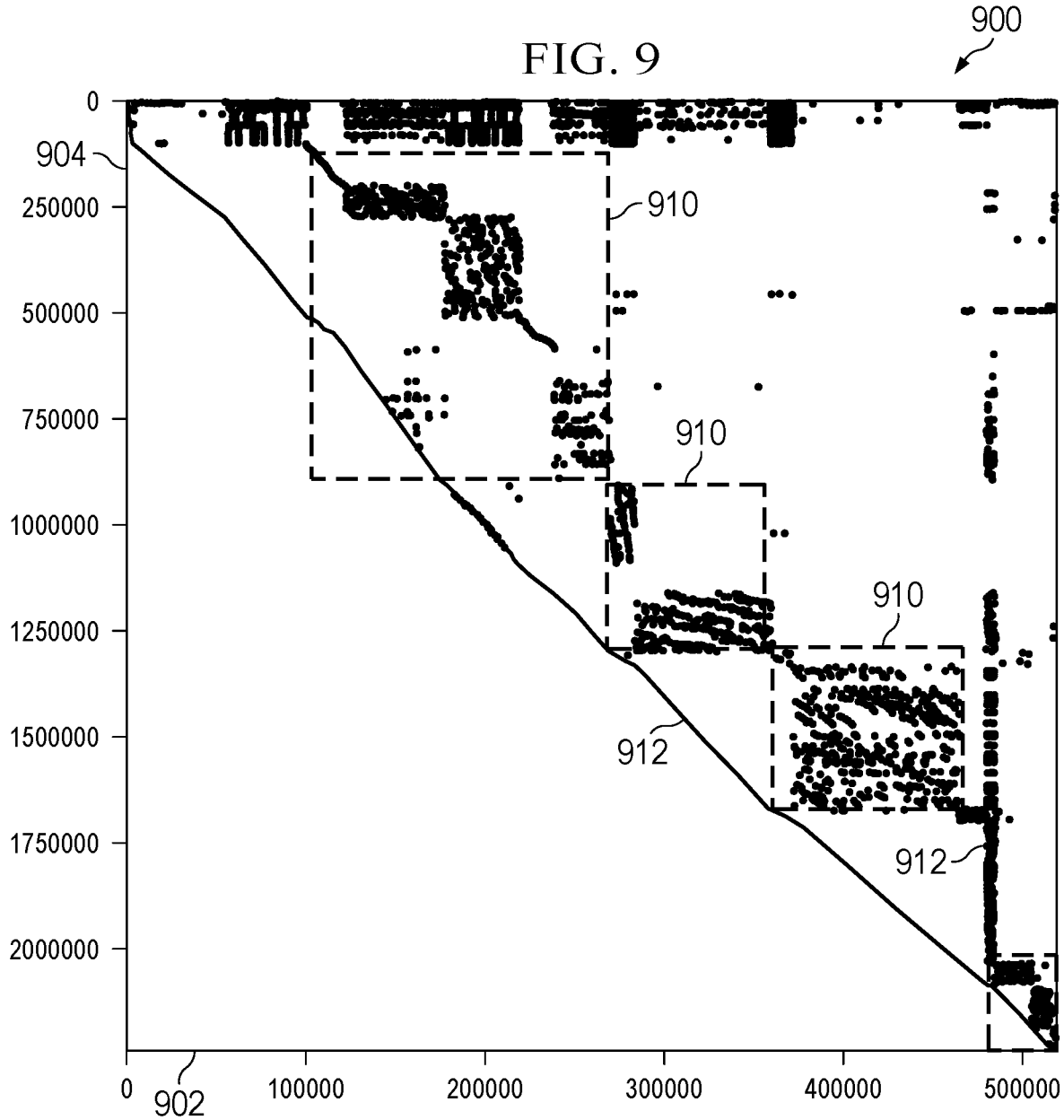
FIG. 9 illustrates a visualization of a supply chain structure analysis of an LP supply chain planning problem, according to a first embodiment.

FIG. 9 illustrates visualization 900 of a supply chain structure analysis of an LP supply chain planning problem, according to a first embodiment. Visualization 900 comprises a monochrome image (such as, for example, black and white), wherein a single color indicates an overall complexity of the supply chain planning problem. X-axis 902 represents the constraint indices, and Y-axis 904 represents the variable indices. According to embodiments, user interface module 254 may display visualizations of supply chain structure analysis 900 that indicate one or more locations where the LP problem may be partitionable, which may then be used to solve the supply chain problem using one or more decomposition methods. These visualization may indicate the types of constraints, one or more supply chain entities 160, supply chain stages, or other factors that add to complexity of the LP problem. As shown in visualization 900, image analyzer 120 converts LP matrices 222 into a monochrome image to identify clusters 910 (block structures) and contours 912 (complicating constraints), which indicate supply chain components and connecting flows among them. Visualization 900 comprises a supply chain problem image of a complex supply chain, where some clusters 910 are connected through coupling constraints. In addition, complexity of the supply chain may be indicated by density or sparsity of particular regions.

Figure 10:
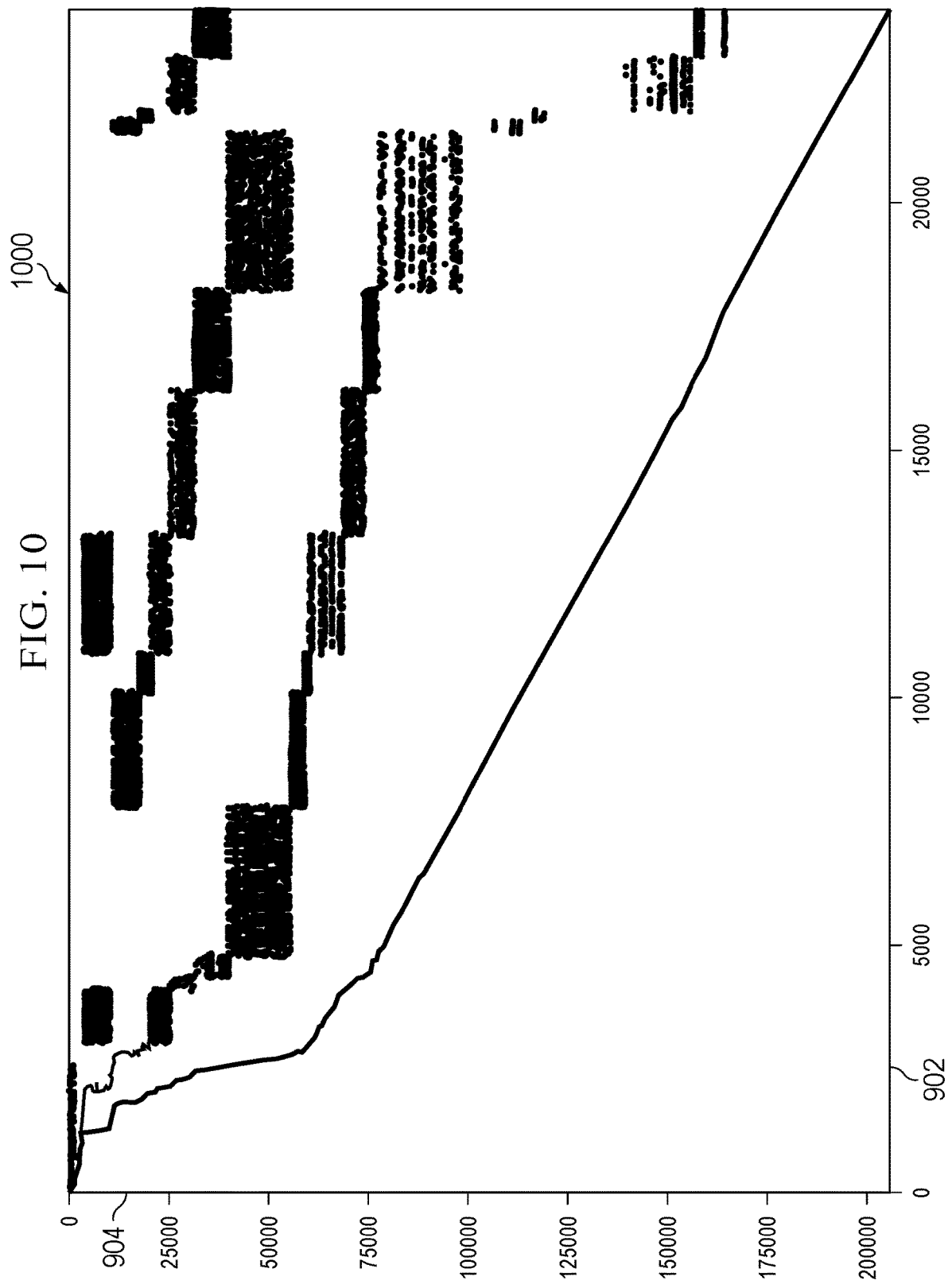
FIG. 10 illustrates a visualization of a supply chain structure analysis of an LP supply chain planning problem, according to a second embodiment.

FIG. 10 illustrates visualization 1000 of a supply chain structure analysis of an LP supply chain planning problem, according to a second embodiment. Visualization 1000 comprises a monochrome image of an LP supply chain planning problem different than visualization 900. Comparing visualization 900 with visualization 1000, the relative density of supply chain problem images 266, represented by the density of the block structures, and the closeness and distribution of the plotted points, indicates the connectivity of different components of the supply chain and of the supply chain, as a whole.

Figure 11:
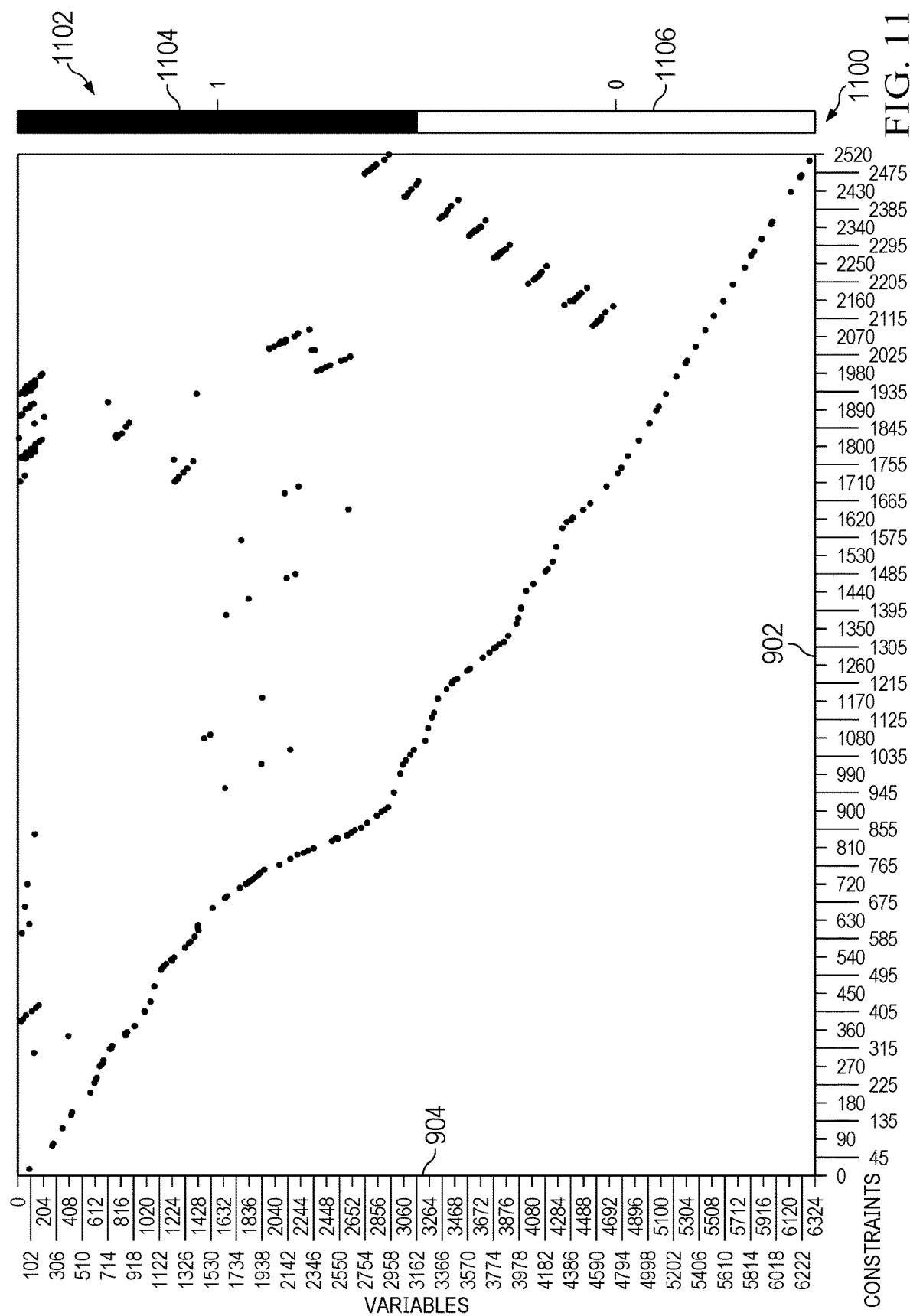
FIG. 11 illustrates a visualization of a supply chain structure analysis of an LP supply chain planning problem, according to a third embodiment.

FIG. 11 illustrates visualization 1100 of a supply chain structure analysis of an LP supply chain planning problem, according to a third embodiment. Visualization 1100 comprises a monochrome image of an LP supply chain planning problem, as disclosed above. Supply chain structure key 1102 indicates the criteria used to color pixels for the supply chain structure analysis displayed by visualization 1100. In one embodiment, supply chain structure key 1102 of a monochromatic visualization of a supply chain structure analysis indicates the color that is applied to each pixel is based on the presence or absence of a variable in a particular constraint. Continuing with the example illustrated by visualization 1100, the value "1" indicates the presence of the variable in the constraints, and the value "0" indicates the absence of the variable in the constraints. Supply chain structure key 1102 of visualization 1100 indicates that pixels representing the variables which are present are colored white and plotted as a white dot, and pixels representing the variables which are absent are colored black and plotted as a black dot. The visualizations of the following examples using the functional identification of variables and constraints to provide color visualizations of the supply chain planning problem of visualization 1100.

Figure 12:
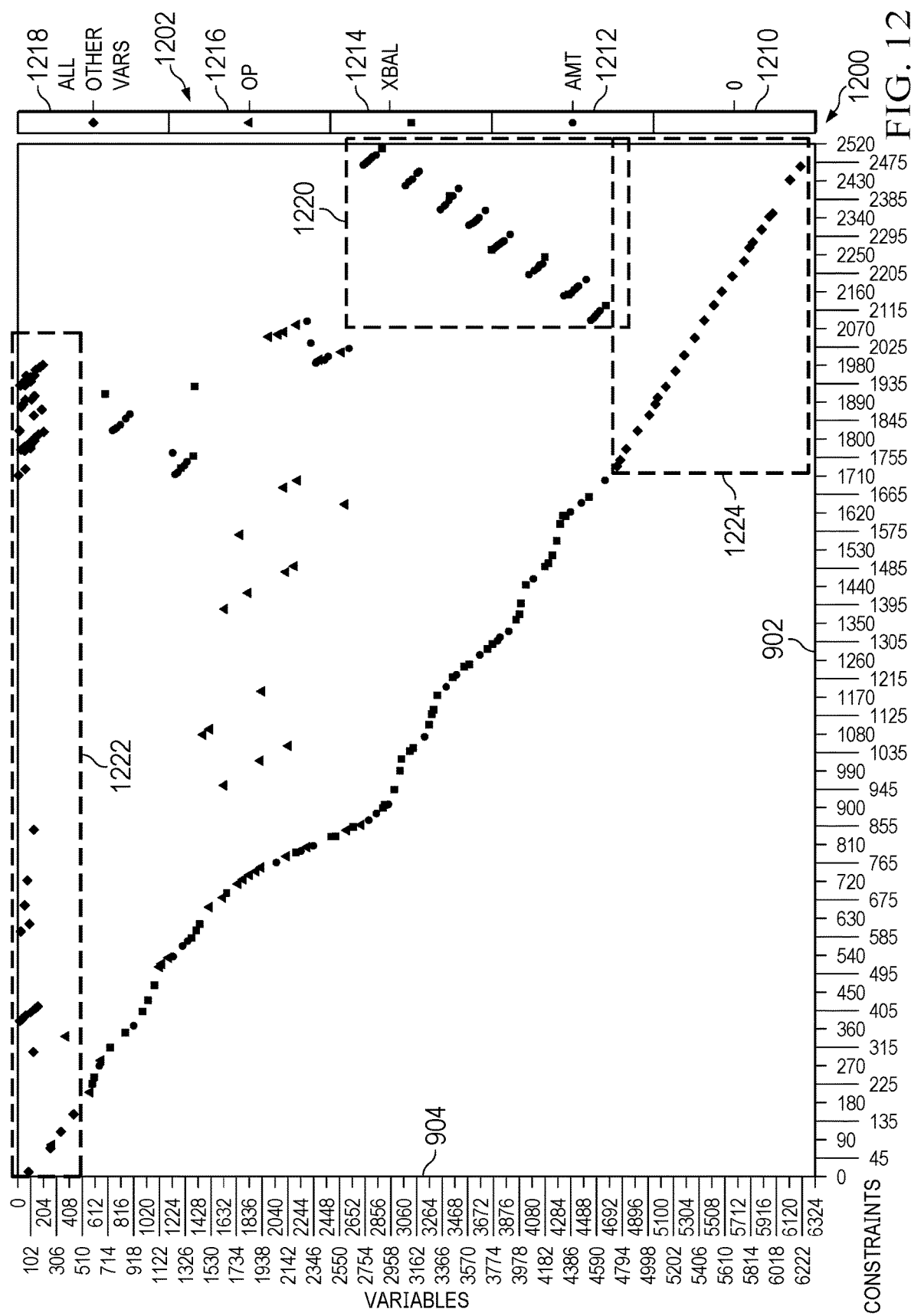
FIG. 12 illustrates a visualization of a variable image analysis of the LP supply chain planning problem of FIG. 11, according to an embodiment.

FIG. 12 illustrates visualization 1200 of a variable image analysis of the LP supply chain planning problem of FIG. 11, according to an embodiment. Visualization 1200 comprises a supply chain problem image of the same LP supply chain planning problem of visualization 1100 wherein visualization engine 252 uses pixel-coloring logic 260 to color pixels of the supply chain problem image according to variable key 1202. Variable key 1202 indicates the color that visualization engine 252 assigns to each pixel according to the functionality of the variables and/or the coefficients: variables having a zero-coefficient (0) 1210; demand variables (AMT) 1212; flow-balance variables (XBAL) 1214; operation variables (OP) 1216; and all other types of variables (OTHER) 1218. In one embodiment, visualization engine 252 colors variables having a zero constraints 1210 as black. In addition, or as an alternative, pixels which are colored black may indicate the absence of any color applied to that pixel. Accordingly, each pixel of the supply chain problem image of visualization 1200 which is black indicates the coefficient for that pixel has a zero coefficient, as indicated by row-column coefficients 228. Continuing with this example and according to this embodiment, non-black pixels of the supply chain problem image of visualization 1200 are colored white for demand variables 1212, green for flow-balance variables 1214; blue for operation variables 1216; and red for all other types of variables 1218.

Visualization 1200 indicates that most of demand variables 1212 are located in the downstream and later constraints, as shown by grouping 1220 of pixels colored for demand variables 1212 as indicated by variable key 1202 being located toward the higher values of the x-axis 902 and y-axis 904. Capacity variables are included with all other types of variables 1218, which are present in grouping 1222 and grouping 1224. The amount of pixels representing all other types of variables 1218 then the LP supply chain planning problem represented by visualization 1200 does not have many capacity constraints.

Figure 13:
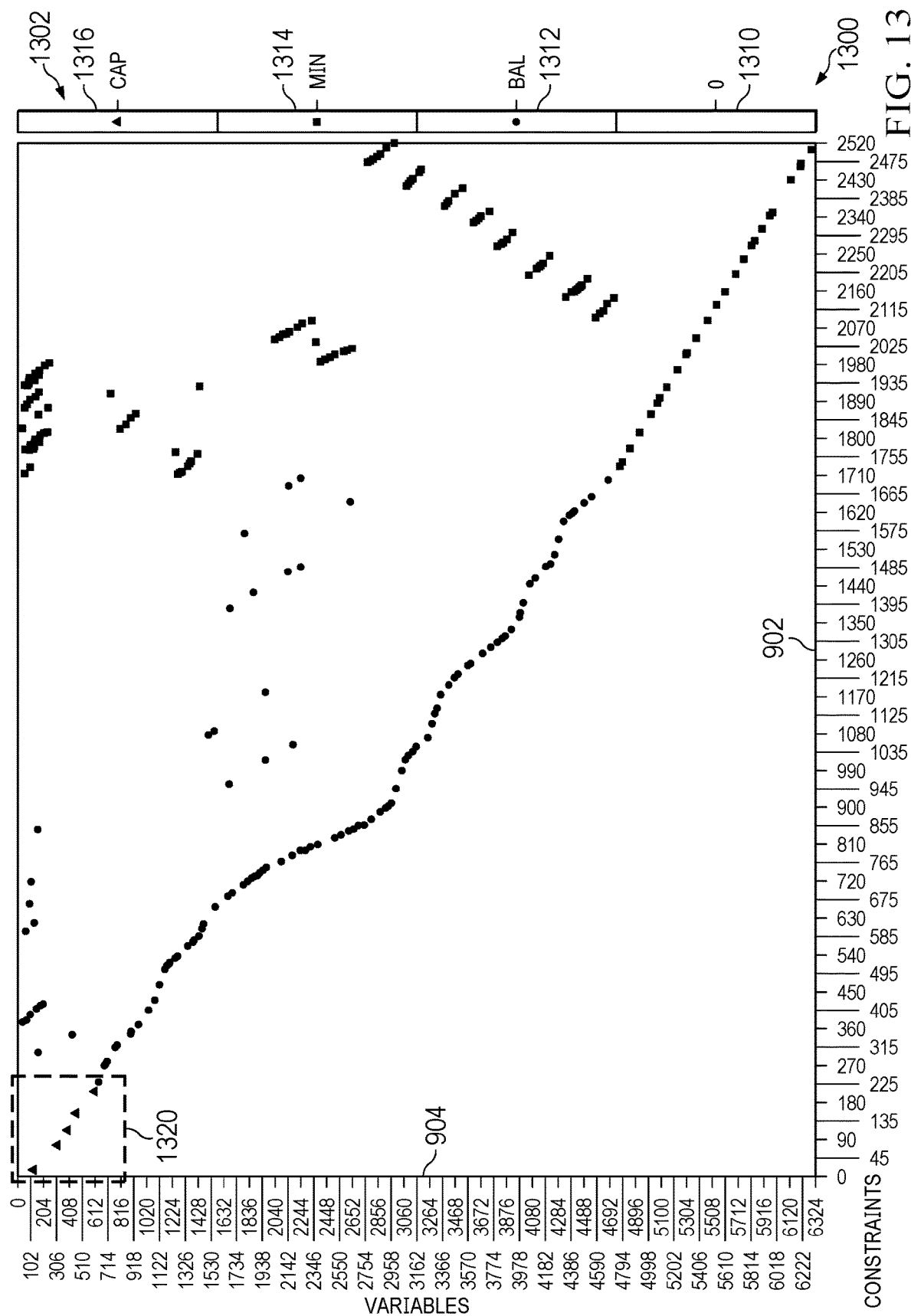
FIG. 13 illustrates a visualization of constraint image analysis of the LP supply chain planning problem of FIG. 11, according to an embodiment.

FIG. 13 illustrates visualization 1300 of constraint image analysis of the LP supply chain planning problem of FIG. 11, according to an embodiment. Similarly to variable image analysis visualization 1200, visualization 1300 comprises a supply chain problem image wherein visualization engine 252 colors pixels according to the function of the constraint associated with the pixel, wherein the black pixels 1310 indicate row-column coefficients 228 are zero. The non-black pixels of the supply chain problem image of visualization 1300 represent three types of constraints: balance constraints 1312 (BAL); minimization constraints (MIN) 1314; and capacity constraints (CAP) 1316. Grouping 1320 comprises capacity constraints 1316 present in earlier buckets near the upstream supply chain, as indicated by the location of grouping 1320 near the lowest values of the x-axis 902 and y-axis 904.

Figure 14:
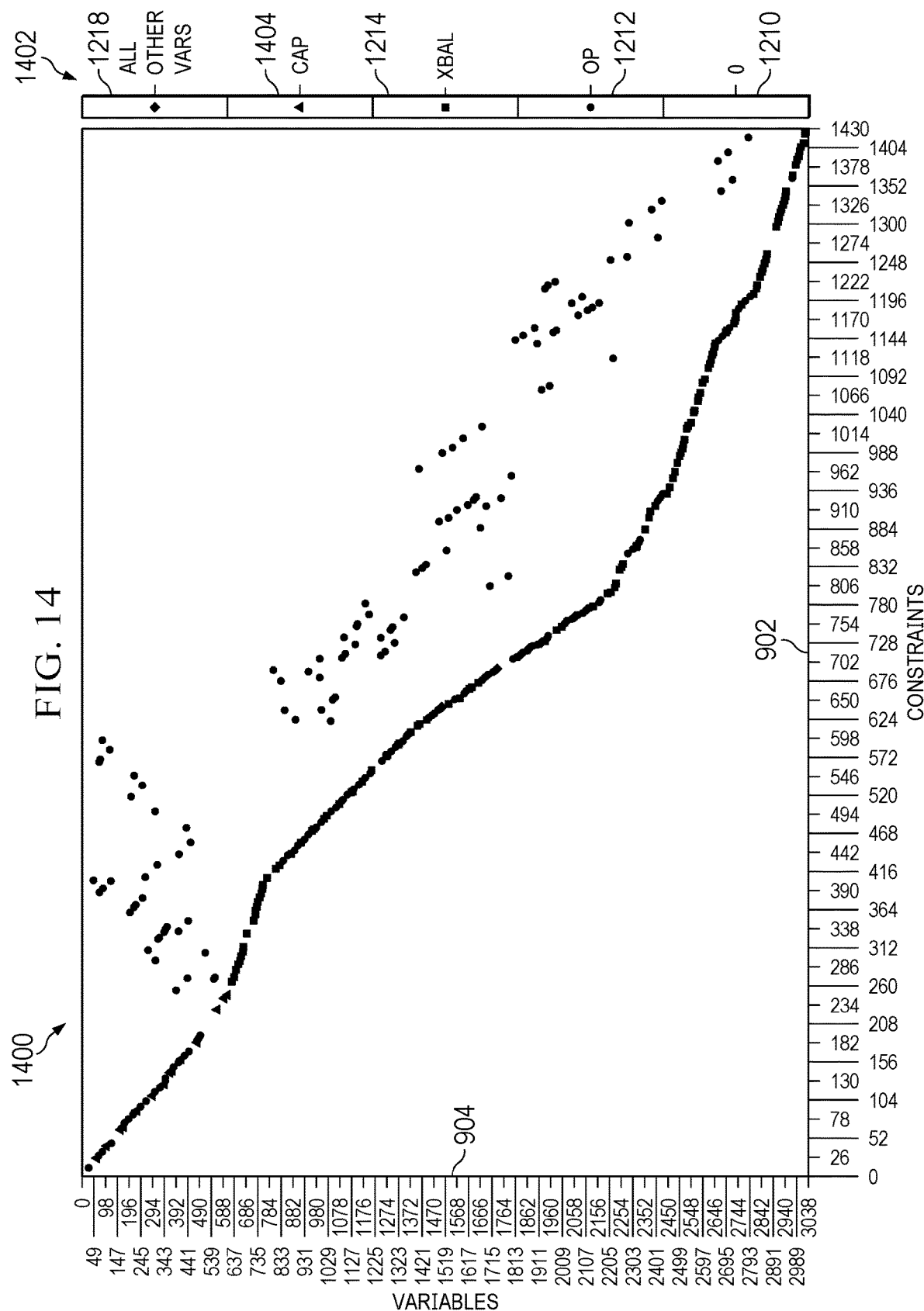
FIG. 14 illustrates a visualization of a variable image analysis of a multi-objective hierarchical LP supply chain planning problem prior to solving for a first objective, according to an embodiment.

FIG. 14 illustrates visualization 1400 of a variable image analysis of a multi-objective hierarchical LP supply chain planning problem prior to solving for a first objective, according to an embodiment. Visualization 1400 comprises a supply chain problem image representing the LP matrix at the highest hierarchical objective of a multi-objective hierarchical LP supply chain planning problem. According to embodiments, image analyzer 120 compares visualizations of the LP matrix of a multi-objective hierarchical LP supply chain planning problem at a first one or more objectives with visualizations at a second one or more objectives.

Figure 15:
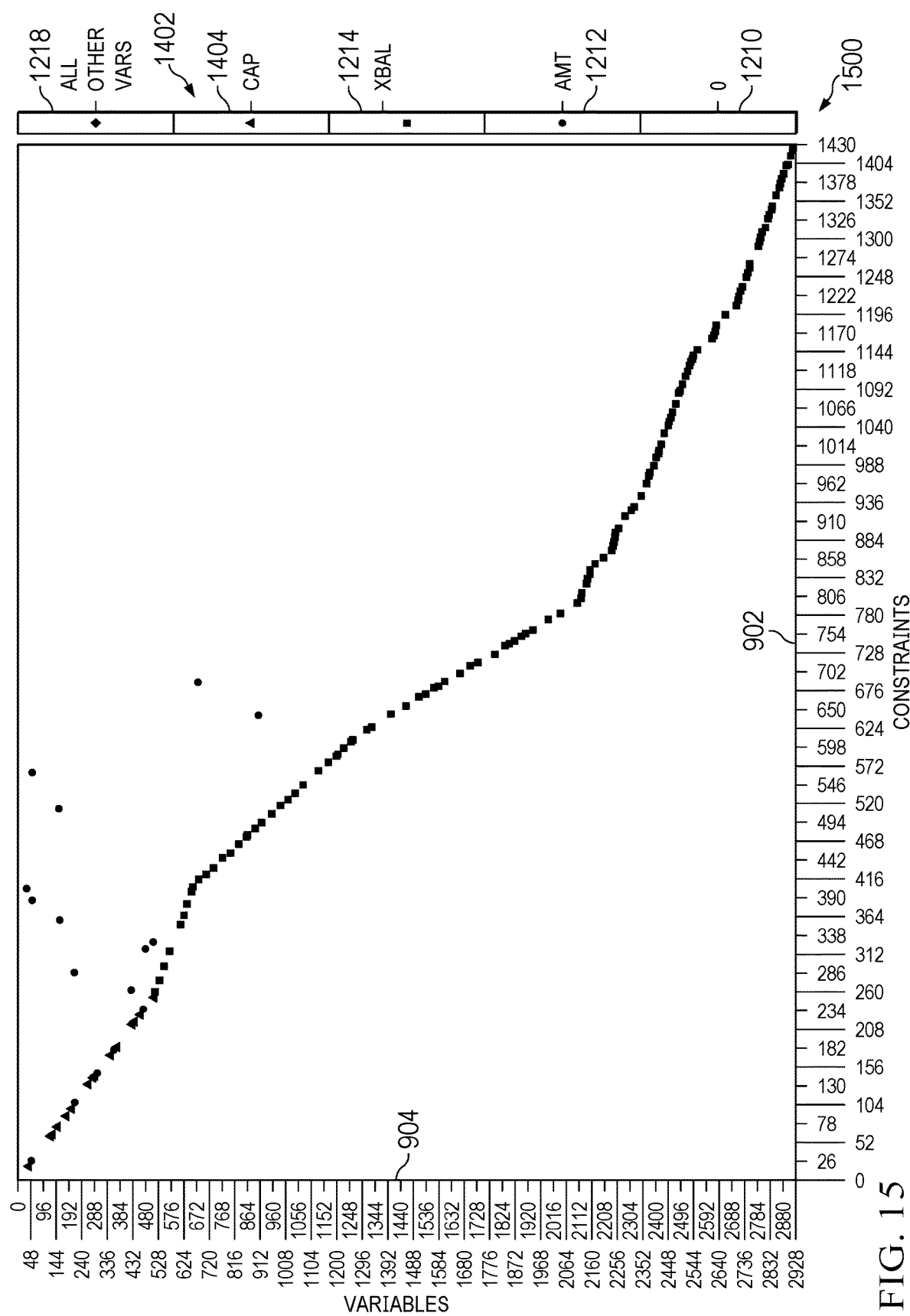
FIG. 15 illustrates a visualization of a variable image analysis of the multi-objective hierarchical LP supply chain planning problem of FIG. 14 prior to solving for the twenty-third objective level, according to an embodiment.

FIG. 15 illustrates visualization 1500 of a variable image analysis of the multi-objective hierarchical LP supply chain planning problem of FIG. 14 prior to solving for the twenty-third objective level, according to an embodiment. Visualizations 1400 and 1500 comprise variable key 1402, which uses a different colorization scheme than variable key 1202 of visualization 1200. Variable key 1402 of visualization 1400 indicates visualization engine 252 assigns to each pixel a color according to the functionality and/or the coefficient of that pixel's variable: variables having a zero-coefficient (0) 1210 are black; operation variables (OP) 1216 are white; flow-balance variables (XBAL) 1214 are green; capacity variables (CAP) 1404 are blue; and all other types of variables (OTHER) 1218 are red.

Comparing visualization 1500 of the LP matrix representing the twenty-third objective level with visualization 1400 of the LP matrix representing the first objective level, most of the operations variables present at the first objective level are fixed by the twenty-third objective level, as indicated by the pixels representing operation variables 1216. Assuming that the twenty-third objective affects the volume of safety stock, user interface module 254 may generate an indication that the manufacturing plan is sufficiently closed and decided prior to the solving of the twenty-third objective (safety stock objective). In response, solver 204 may determine to not solve one or more of the lower objectives, which solver 204 evaluates instead. In addition, embodiments contemplate image analyzer 120 using image analysis method 700 to compare a higher objective of a multi-objective hierarchical LP supply chain planning problem with a lower objective to reveal changes between the generated supply chain problem images 266 indicating changes in the complexity with changes in business goal optimization in the objective hierarchy, changes in bounds of the supply chain variables (indicated by one or more columns being colored black), and changes in duals for constraints (such as, for example, a resource) which may represented by coloring an entire row black.

By way of further explanation only and not by way of limitation, The following examples of image analysis are provided for a supply chain planning problem modeled from a sample dataset and generating an LP matrix having a matrix size of 964,896,620,426 (comprising 513,167 constraints, 1,880,278 variables, and 4,094,452 non-zero coefficients) is provided below.

Figure 16:
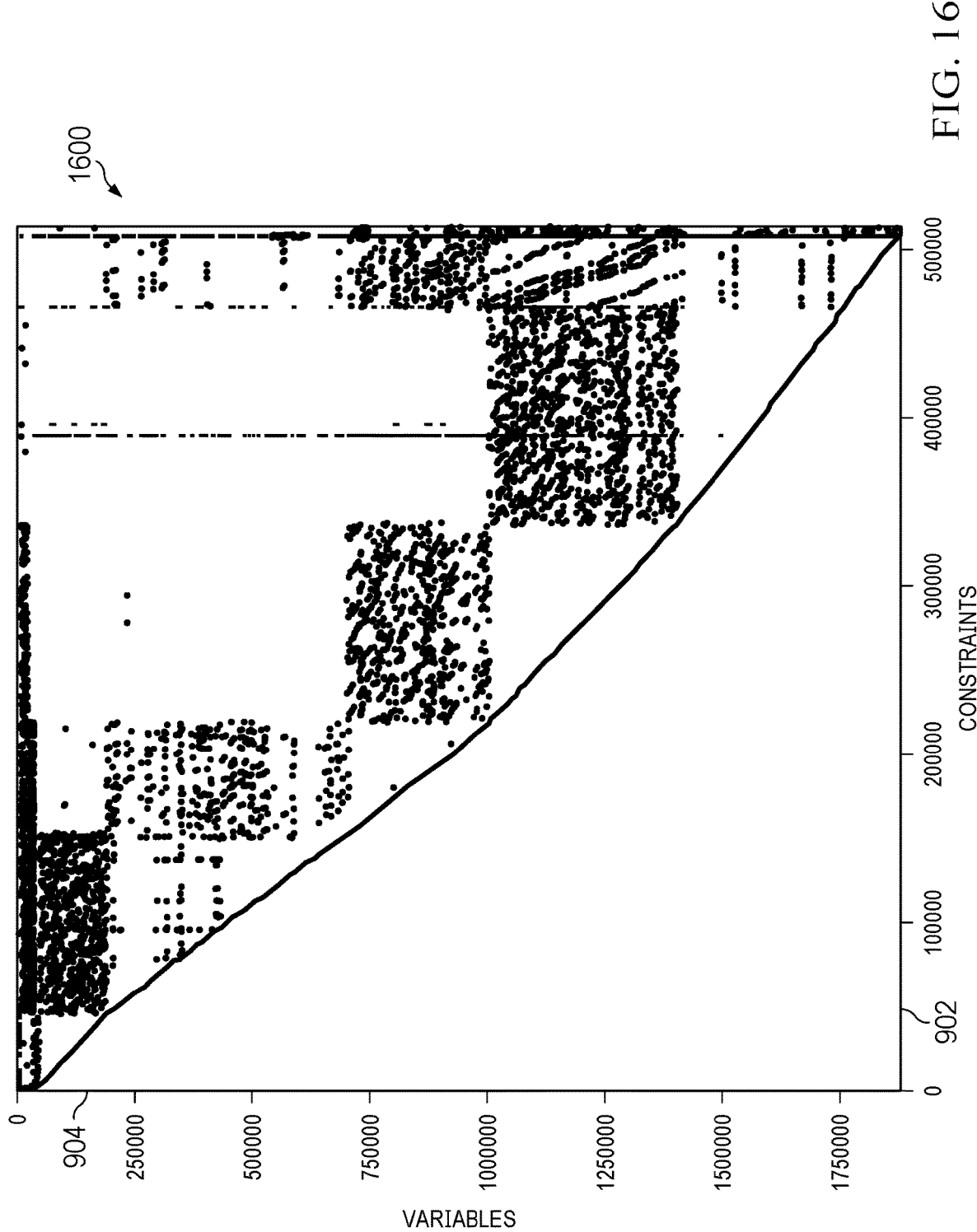
FIG. 16 illustrates a visualization of a supply chain structure analysis of an LP supply chain planning problem, according to a further embodiment.

FIG. 16 illustrates visualization 1600 of a supply chain structure analysis of an LP supply chain planning problem, according to a further embodiment. The black and white image illustrates the supply chain as substantially a block structure of the LP problem, where the staircase structure indicates that decomposition is possible along the long contour that connects the block components together, which represents the flow of materials through the supply chain from earlier time buckets to later time buckets and upstream buffers to downstream buffers.

Figure 17A:
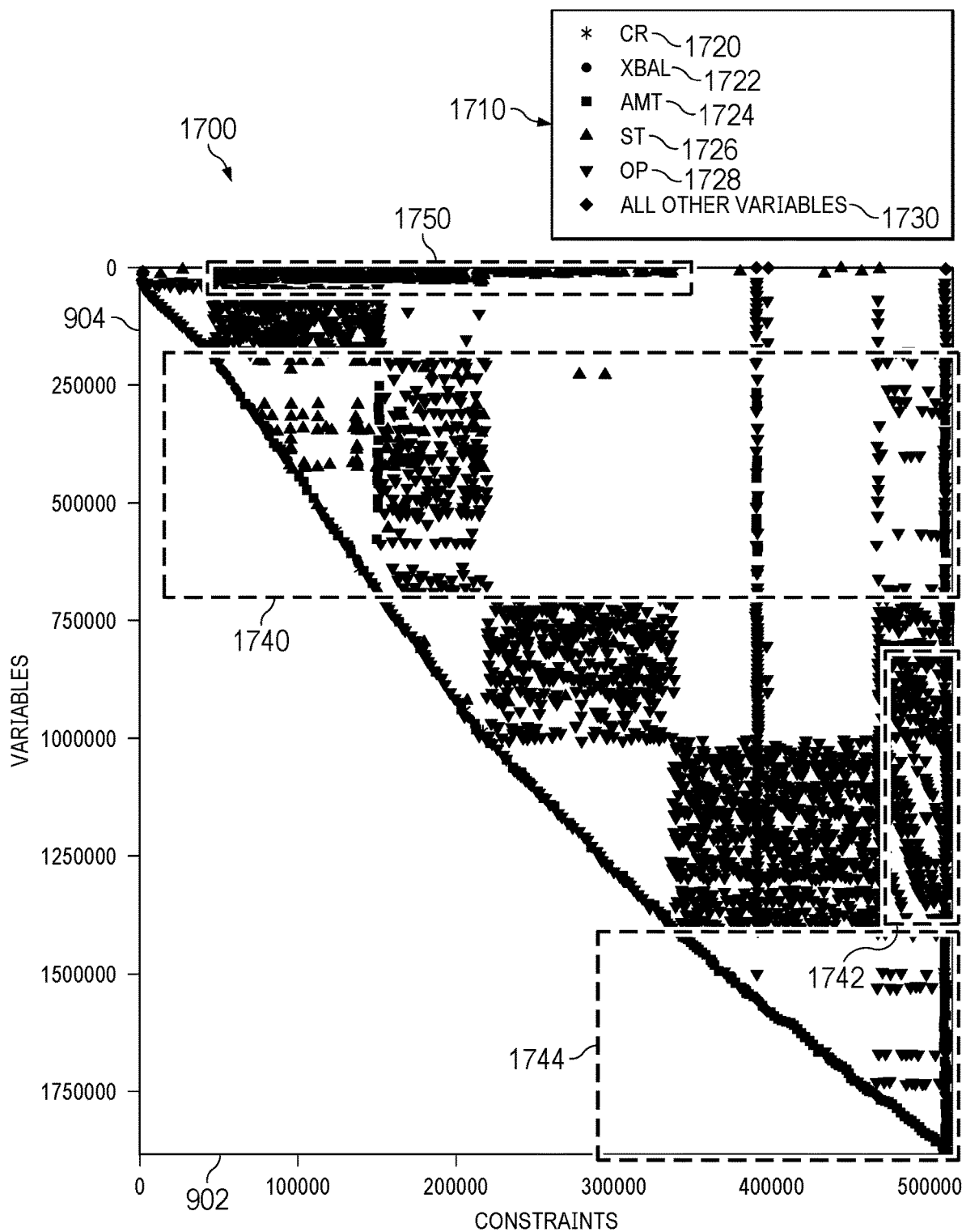
FIGS. 17A and 17B illustrate visualizations of a variable image analysis of the multi-objective hierarchical LP supply chain planning problem of FIG. 16 prior to solving for a first objective and prior to solving for a seventy-eighth objective, according to an embodiment.
Figure 17B:
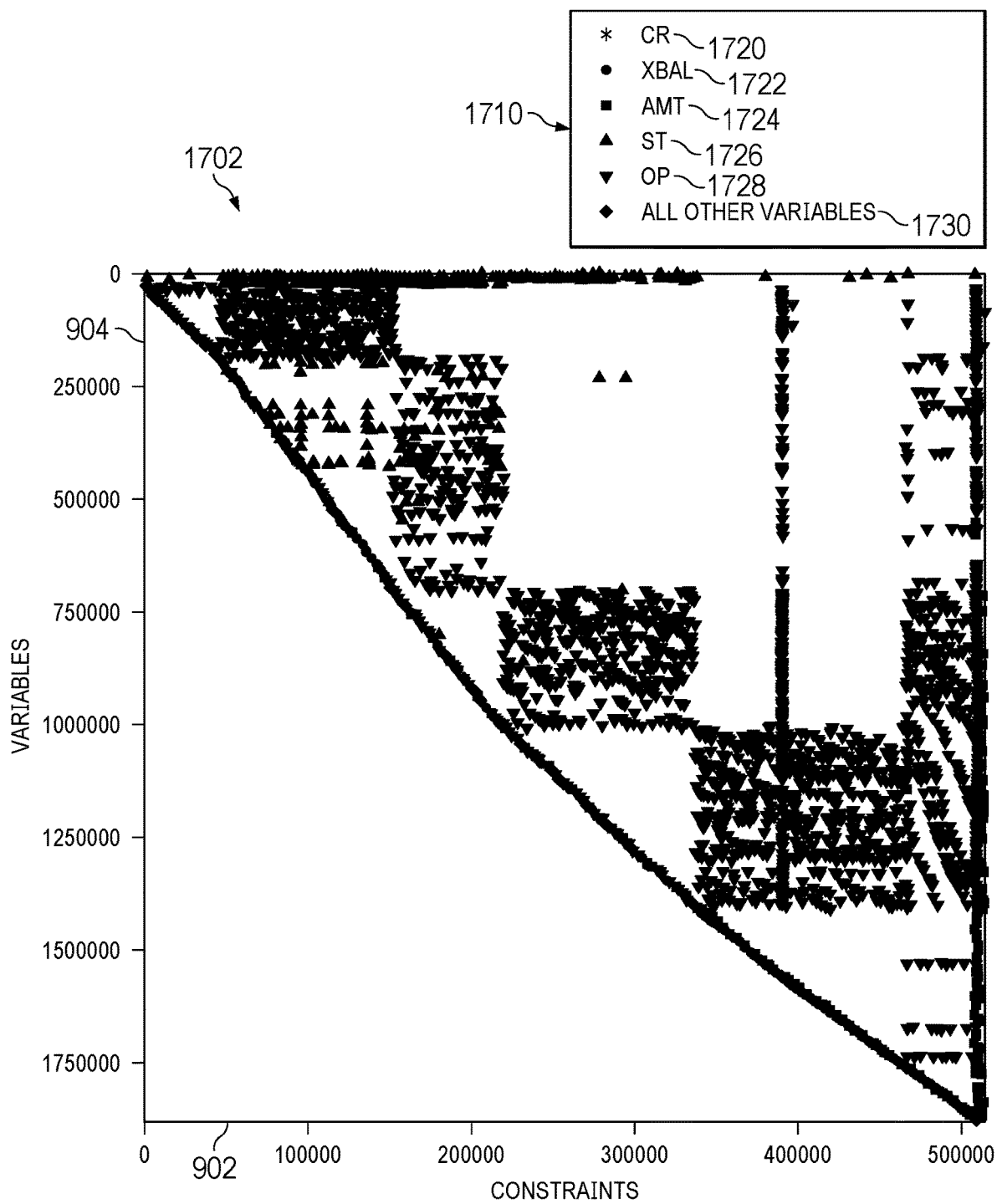

FIGS. 17A and 17B illustrate visualizations 1700-1702 of a variable image analysis of the multi-objective hierarchical LP supply chain planning problem of FIG. 16 prior to solving for a first objective and prior to solving for a seventy-eighth objective, according to an embodiment. Visualization 1700 comprises a supply chain problem image of the LP matrix prior to solving for the first objective of a multi-objective hierarchical LP supply chain planning problem. Visualization 1702 comprises a supply chain problem image of the LP matrix prior to solving for the seventy-eighth objective of the same multi-objective hierarchical LP supply chain planning problem of visualization 1700. Comparing visualization 1700 with visualization 1702, the increased sparseness of visualization 1702 indicates most of the variables are fixed at the level of the lower objective (i.e. prior to solving for the seventy-eighth objective) than prior to solving for the first objective.

Variable key 1710 of visualizations 1700-1702 indicates visualization engine 252 assigns to each pixel a color according to the functionality of the variable for non-zero coefficients, as indicated by row-column coefficients 228: maximum days of cover variables (CR) 1720; flow-balance variables (XBAL) 1722; demand variables (AMT) 1724; alternate raw material or resource variables (ST) 1726; operation variables (OP) 1728; and all other variables (OTHER) 1730. In one embodiment, visualization engine 252 colors the pixels for maximum days of cover variables 1720 as green; flow-balance variables 1722 are colored blue; demand variables 1724 are colored red; alternate raw material or resource variables 1726 are colored yellow; operation variables 1728 are colored orange; and all other variables 1730 are colored white. Referring to visualization 1700, operation variables 1728 are represented throughout the LP supply chain planning problem indicated by the pixels colored for operations variables 1728 present over much of the supply chain problem image; this indicates operations variables 1728 are the most available components in the visualized LP supply chain planning problem. Demand variables 1724 are present in different segments. A first grouping of demand variables 1724 are present at an early stage of the time horizon, indicated by first grouping 1740 near the upper part of the image (lower value along y-axis 904). A smaller number of variables are present in the middle of the time horizon indicated by second grouping 1742 of demand variables 1724 near the middle of y-axis 904. However, most of the demand request is at the end of the time horizon, represented by third grouping 1744 of demand variables 1724 present at the lowest part of y-axis 904. Grouping 1750 of alternate raw or material resource variables 1726 appearing on the upper part of the image (at an early part of the time horizon and at an upstream operation of the supply chain), indicate the visualized LP supply chain planning problem comprises alternate operations. Comparing visualization 1700 with visualization 1702, first grouping 1740, second grouping 1742, and third grouping 1744 of demand variables 1724 in visualization 1700 are greatly reduced in visualization 1702. The lack of demand variables 1724 in visualization 1702 compared with visualization 1700 indicates most of demand variables 1724 are fixed at the level of the lower objective associated with visualization 1702 (i.e. prior to solving for the seventy-eighth objective).

Figure 18A:
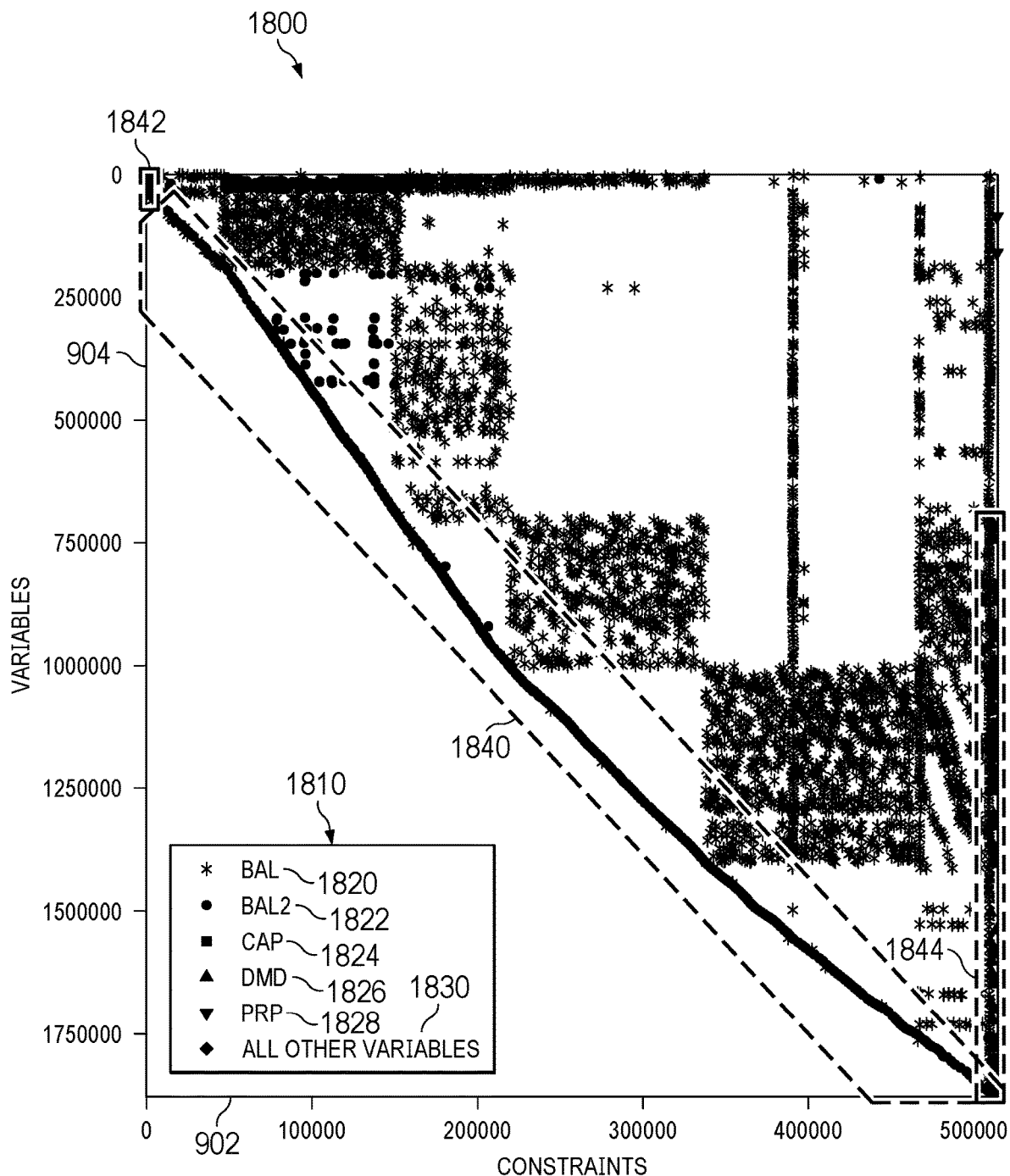
FIGS. 18A and 18B illustrate visualizations of a constraint image analysis of the multi-objective hierarchical LP supply chain planning problem of FIG. 16 prior to solving for a first objective and prior to solving for a seventy-eighth objective, according to an embodiment.
Figure 18B:
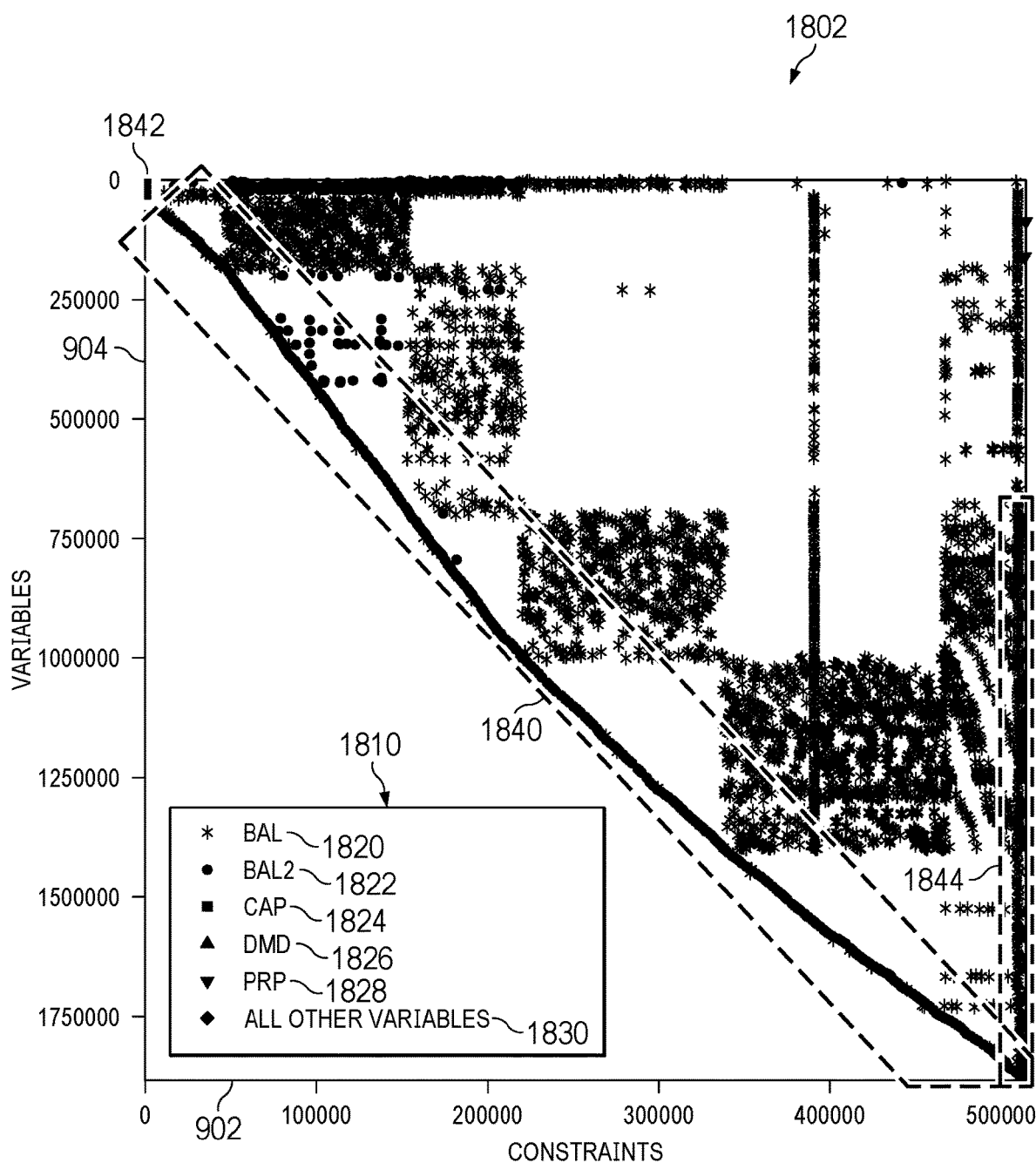

FIGS. 18A and 18B illustrate visualizations 1800-1802 of a constraint image analysis of the multi-objective hierarchical LP supply chain planning problem of FIG. 16 prior to solving for a first objective and prior to solving for a seventy-eighth objective, according to an embodiment. Visualization 1800 comprises a supply chain problem image of the LP matrix prior to solving for the first objective of a multi-objective hierarchical LP supply chain planning problem. Visualization 1802 comprises a supply chain problem image of the LP matrix prior to solving for the seventy-eighth objective of the same multi-objective hierarchical LP supply chain planning problem of visualization 1800.

Constraint key 1810 of visualizations 1800-1802 indicates visualization engine 252 assigns to each pixel a color according to the functionality of that pixel's constraint for pixels associated with non-zero coefficients, as indicated by row-column coefficients 228: in-node inventory balance constraints (BAL) 1820; out-node inventory balance constraints (BAL2) 1822; capacity constraints (CAP) 1824; demand constraints (DMD) 1826, proportional alternate constraints (PRP) 1828; and all other constraints (OTHER) 1830. In one embodiment, visualization engine 252 colors the pixels for in-node inventory balance constraints 1820 as green; out-node inventory balance constraints 1822 are colored blue; capacity constraints 1824 are colored red; demand constraints 1826 are colored yellow; proportional alternate constraints 1828 are colored orange; and all other constraints 1830 are colored white.

In this example, in-node inventory balance constraints 1820 and out-node inventory balance constraints 1822 cover much of the colored area in visualizations 1800-1802, caused by their being the most constraining components of the multi-objective hierarchical LP supply chain planning problem represented by visualizations 1800-1802. Material flow in the supply chain from earliest time bucket to latest time bucket is mathematically formulated by out-node inventory balance constraints 1822, which is represented by the long contour 1840 that runs diagonally across visualizations 1800-1802. Capacity constraints 1824 appear at an early stage of the supply chain of the of the multi-objective hierarchical LP supply chain planning problem represented by visualizations 1800-1802, as indicated by location by the closeness of grouping 1842 to zero on the y-axis 904. Grouping 1844 of demand constraints 1826 run vertically along the right-hand side of visualizations 1900-1902, which indicates demand constraints are 1826 are linked by a large number of variables and are not a type of flow balanced constraint.

Figure 19A:
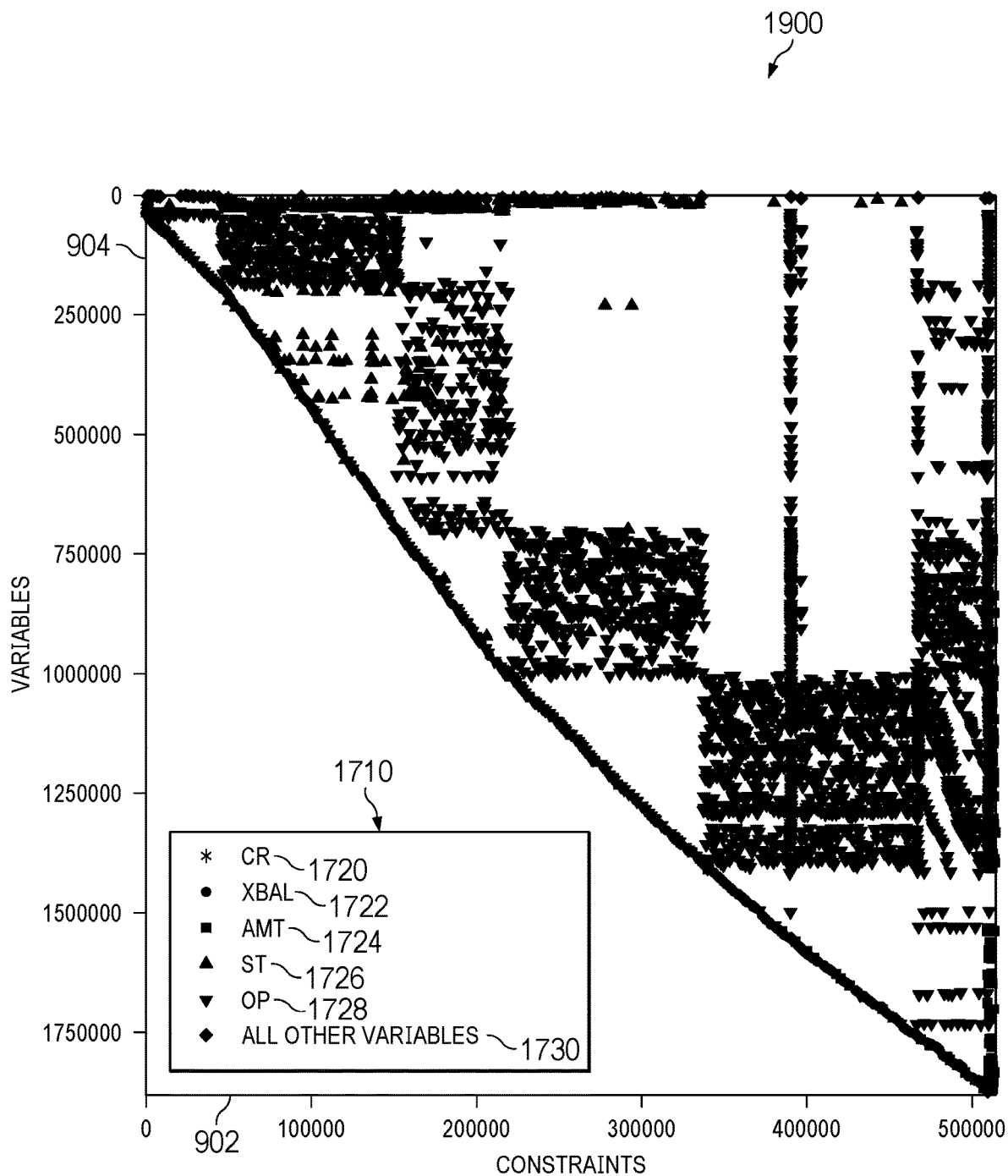
FIGS. 19A and 19B illustrate visualizations of a variable image analysis with positive coefficient coloring of the multi-objective hierarchical LP supply chain planning problem of FIG. 16 prior to solving for a first objective and prior to solving for a seventy-eighth objective, according to an embodiment.
Figure 19B:
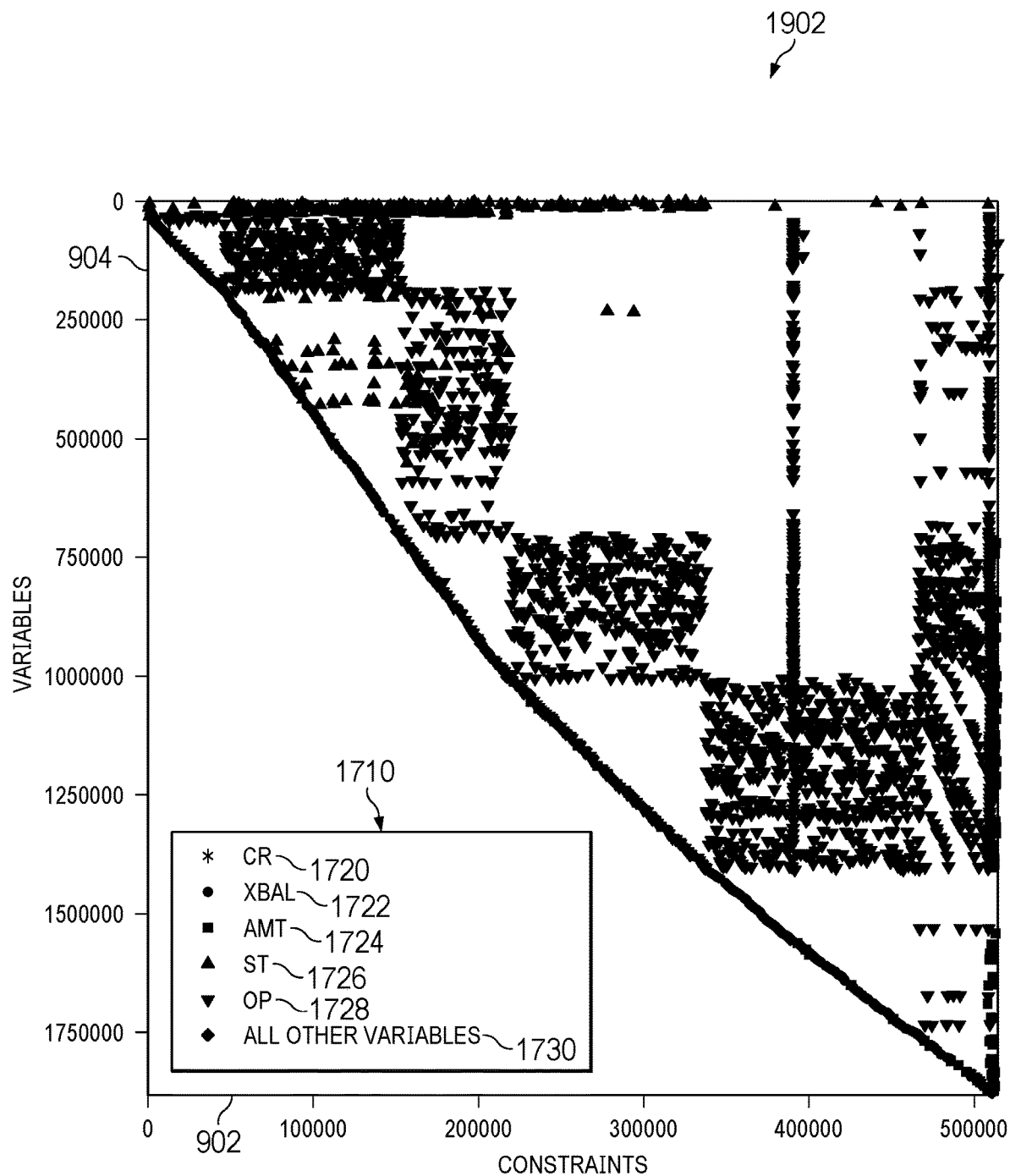

FIGS. 19A and 19B illustrate visualizations 1900-1902 of a variable image analysis with positive coefficient coloring of the multi-objective hierarchical LP supply chain planning problem of FIG. 16 prior to solving for a first objective and prior to solving for a seventy-eighth objective, according to an embodiment. Visualizations 1902-1904 comprise supply chain problem images of the LP matrix prior to solving a multi-objective hierarchical LP supply chain planning problem prior to the first objective (visualization 1902) and prior to the seventy-eighth objective (visualization 1904). Visualization engine 252 generates supply chain problem images of visualizations 1902-1904 wherein all pixels associated with a negative or zero coefficient, as indicated by row-column coefficients 228, are black; and pixels with positive coefficients are colored according to variable key 1702, as disclosed above. Because demand variables 1724 have negative coefficients, no pixels of visualizations 1902-1904 are colored red.

Although particular examples of supply chain planning problems are illustrated and described in connection with the particular supply chain problem images 266, embodiments contemplate additional image analysis and insights according to particular needs.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system of image analysis of planning problems modeled as linear programing (LP) problems, comprising:
   a computer, comprising a processor and memory, the computer configured to:
   receive an LP matrix representing constraints and variables of at least a portion of a planning problem;
   identify functions of the variables and the constraints;
   color pixels of a problem image based, at least in part, a link between each pixel and a corresponding individual variable or constraint to determine a color of each pixel;
   determine locations of the pixels on the problem image based, at least in part, on a link between each pixel and a column matrix location of a sorted variable index and a row matrix location of a sorted constraint index;
   display a visualization of the problem image based on the colored pixels; and
   update the visualization of the problem image based on receiving one or more updates to the variables.

2. The system of claim 1, wherein the computer is further configured to:
   refresh the visualization of the problem image based on filtering one or more of the variables and the constraints.

3. The system of claim 1, wherein the computer is further configured to:
   color pixels based on a value of row-column coefficients of the LP matrix satisfying one or more threshold values.

4. The system of claim 3, wherein the one or more threshold values indicate a minimum, a maximum, or a range.

5. The system of claim 3, wherein the computer is further configured to:
   receive one or more threshold changes comprising one or more modifications to the one or more threshold values; and
   in response to receiving the one or more threshold changes, update the problem image by removing, adding, or differently coloring pixels.

6. The system of claim 1, wherein the computer is further configured to:
   determine dimensions of the problem image based on a total number of variables and constraints in the LP matrix.

7. The system of claim 1, wherein the color of each pixel indicates domain and categorization of elements of the problem image.

8. A computer-implemented method of image analysis of planning problems modeled as linear programing (LP) problems, comprising:
   receiving an LP matrix representing constraints and variables of at least a portion of a planning problem;
   identifying functions of the variables and the constraints;
   coloring pixels of a problem image based, at least in part, a link between each pixel and a corresponding individual variable or constraint to determine a color of each pixel;
   determining locations of the pixels on the problem image based, at least in part, on a link between each pixel and a column matrix location of a sorted variable index and a row matrix location of a sorted constraint index;
   displaying a visualization of the problem image based on the colored pixels; and
   updating the visualization of the problem image based on receiving one or more updates to the variables.

9. The computer-implemented method of claim 8, further comprising:
   refreshing the visualization of the problem image based on filtering one or more of the variables and the constraints.

10. The computer-implemented method of claim 8, further comprising:
    coloring pixels based on a value of row-column coefficients of the LP matrix satisfying one or more threshold values.

11. The computer-implemented method of claim 10, wherein the one or more threshold values indicate a minimum, a maximum, or a range.

12. The computer-implemented method of claim 10, further comprising:
    receiving one or more threshold changes comprising one or more modifications to the one or more threshold values; and
    in response to receiving the one or more threshold changes, updating the problem image by removing, adding, or differently coloring pixels.

13. The computer-implemented method of claim 8, further comprising:
    determining dimensions of the problem image based on a total number of variables and constraints in the LP matrix.

14. The computer-implemented method of claim 8, wherein the color of each pixel indicates domain and categorization of elements of the problem image.

15. A non-transitory computer-readable medium embodied with software providing image analysis of planning problems modeled as linear programing (LP) problems, the software when executed:
    receives an LP matrix representing constraints and variables of at least a portion of a planning problem;
    identifies functions of the variables and the constraints;
    colors pixels of a problem image based, at least in part, on a link between each pixel and a corresponding individual variable or constraint to determine a color of each pixel;
    determines locations of the pixels on the problem image based, at least in part, on a link between each pixel and a column matrix location of a sorted variable index and a row matrix location of a sorted constraint index;
    displays a visualization of the problem image based on the colored pixels; and
    updates the visualization of the problem image based on receiving one or more updates to the variables.

16. The non-transitory computer-readable medium of claim 15, wherein the software when executed further:
    refreshes the visualization of the problem image based on filtering one or more of the variables and the constraints.

17. The non-transitory computer-readable medium of claim 15, wherein the software when executed further:

colors pixels based on a value of row-column coefficients of the LP matrix satisfying one or more threshold values.

18. The non-transitory computer-readable medium of claim 17, wherein the one or more threshold values indicate a minimum, a maximum, or a range.

19. The non-transitory computer-readable medium of claim 17 wherein the software when executed further:
receives one or more threshold changes comprising one or more modifications to the one or more threshold values; and
in response to receiving the one or more threshold changes, updates the problem image by removing, adding, or differently coloring pixels.

20. The non-transitory computer-readable medium of claim 15, wherein the software when executed further:
determines dimensions of the problem image based on a total number of variables and constraints in the LP matrix.

* * * * *